(12) United States Patent
Marzinzik et al.

(10) Patent No.: US 12,363,225 B2
(45) Date of Patent: Jul. 15, 2025

(54) AUDIO HANDLER FOR INTELLIGENT VOICE INTERFACE

(71) Applicant: STATE FARM MUTUAL AUTOMOBILE INSURANCE COMPANY, Bloomington, IL (US)

(72) Inventors: Duane Lee Marzinzik, Springfield, IL (US); Eric R. Moore, Heyworth, IL (US); Gregory D. Carter, Bloomington, IL (US); Harsh Lalwani, Normal, IL (US); Matthew Mifflin, Bloomington, IL (US); Padmaja Uppaluri, Bloomington, IL (US); Ryan Jewell, Bloomington, IL (US); Richard J. Lovings, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 153 days.

(21) Appl. No.: 17/870,067

(22) Filed: Jul. 21, 2022

(65) Prior Publication Data

US 2023/0032155 A1  Feb. 2, 2023

Related U.S. Application Data

(60) Provisional application No. 63/231,376, filed on Aug. 10, 2021, provisional application No. 63/224,698, filed on Jul. 22, 2021.

(51) Int. Cl.
*H04M 3/493* (2006.01)
*G06F 3/16* (2006.01)
(Continued)

(52) U.S. Cl.
CPC .......... *H04M 3/4936* (2013.01); *G06F 3/167* (2013.01); *G06F 40/35* (2020.01); *G10L 15/04* (2013.01);
(Continued)

(58) Field of Classification Search
CPC .. H04M 3/4936; H04M 2201/40; G10L 15/22
See application file for complete search history.

(56) References Cited

U.S. PATENT DOCUMENTS 7,515,695 B1  4/2009  Chan et al.
9,848,082 B1  12/2017  Lillard et al.
(Continued)

OTHER PUBLICATIONS

U.S. Appl. No. 17/870,062, Nonfinal Office Action, dated Apr. 10, 2024.
(Continued)

*Primary Examiner* — Amal S Zenati
(74) *Attorney, Agent, or Firm* — MARSHALL, GERSTEIN & BORUN LLP

(57) ABSTRACT

A method provides identification of relevant caller dialog with an intelligent voice interface configured to lead callers through pathways of an algorithmic dialog including available voice prompts. The method may include, during a voice communication with a caller, receiving from the caller device caller input data indicative of a voice input of the caller, and determining, by processing the caller input data, that a first portion of the voice input is intended to convey caller information to the intelligent voice interface, and that a second portion of the voice input is not intended to convey caller information. The method may also include identifying relevant caller information by analyzing the first portion of the voice input without the second portion of the voice input, and storing the relevant caller information in a database and/or selecting a pathway through the algorithmic dialog based upon the relevant caller information.

20 Claims, 23 Drawing Sheets

(51) Int. Cl.

| | | |
|---|---|---|
| *G06F 40/35* | (2020.01) | |
| *G10L 15/04* | (2013.01) | |
| *G10L 15/18* | (2013.01) | |
| *G10L 15/183* | (2013.01) | |
| *G10L 15/22* | (2006.01) | |
| *G10L 15/26* | (2006.01) | |
| *G10L 15/30* | (2013.01) | |
| *G10L 25/63* | (2013.01) | |
| *H04L 51/52* | (2022.01) | |
| *H04M 3/42* | (2006.01) | |

(52) U.S. Cl.
CPC ........ *G10L 15/1815* (2013.01); *G10L 15/183* (2013.01); *G10L 15/22* (2013.01); *G10L 15/26* (2013.01); *G10L 15/30* (2013.01); *G10L 25/63* (2013.01); *H04L 51/52* (2022.05); *H04M 3/42221* (2013.01); *G10L 2015/223* (2013.01); *H04M 2201/40* (2013.01)

(56) References Cited

U.S. PATENT DOCUMENTS

| | | | |
|---|---|---|---|
| 2006/0126803 A1* | 6/2006 | Patel | H04M 3/5166 379/88.01 |
| 2007/0033005 A1 | 2/2007 | Cristo et al. | |
| 2010/0274796 A1 | 10/2010 | Beauregard et al. | |
| 2011/0022394 A1 | 1/2011 | Wide | |
| 2012/0022872 A1 | 1/2012 | Gruber et al. | |
| 2013/0117022 A1 | 5/2013 | Chen et al. | |
| 2014/0253666 A1* | 9/2014 | Ramachandran | H04N 7/147 348/14.06 |
| 2014/0314225 A1 | 10/2014 | Riahi et al. | |
| 2014/0341361 A1* | 11/2014 | Perlmutter | G10L 15/20 379/88.01 |
| 2015/0078539 A1 | 3/2015 | Jain | |
| 2018/0061408 A1 | 3/2018 | Andreas et al. | |
| 2018/0082679 A1 | 3/2018 | McCord et al. | |
| 2018/0183748 A1 | 6/2018 | Zhang et al. | |
| 2019/0037077 A1 | 1/2019 | Konig et al. | |
| 2020/0202361 A1 | 6/2020 | Sampath | |
| 2020/0342873 A1 | 10/2020 | Teserra et al. | |
| 2020/0356243 A1 | 11/2020 | Meyer et al. | |
| 2021/0084149 A1 | 3/2021 | Zeelig et al. | |
| 2022/0070296 A1 | 3/2022 | Friio | |
| 2022/0093086 A1 | 3/2022 | Eedarapalli | |
| 2022/0199079 A1 | 6/2022 | Hanson et al. | |
| 2022/0318669 A1* | 10/2022 | Alexander | G06N 3/0455 |
| 2023/0028693 A1 | 1/2023 | Marzinzik et al. | |

OTHER PUBLICATIONS

U.S. Appl. No. 17/870,071, Nonfinal Office Action, dated Mar. 28, 2024.
U.S. Appl. No. 17/870,076, Nonfinal Office Action, dated Jun. 21, 2024.
U.S. Appl. No. 17/870,062, Notice of Allowance, mailing date of Jul. 18, 2024.
U.S. Appl. No. 17/870,081, Nonfinal Office Action, dated Jul. 18, 2024.
U.S. Appl. No. 17/870,081, Final Office Action, dated Dec. 27, 2024.
U.S. Appl. No. 17/870,071, Notice of Allowance, mailed Jan. 22, 2025.
U.S. Appl. No. 17/870,076, Notice of Allowance, dated Sep. 18, 2024.
U.S. Appl. No. 17/870,084, Nonfinal Office Action, dated Aug. 15, 2024.
U.S. Appl. No. 17/870,071, Final Office Action, dated Oct. 24, 2024.
U.S. Appl. No. 17/870,084, Final Office Action, dated Jan. 29, 2025.
U.S. Appl. No. 17/870,081, Nonfinal Office Action, dated Apr. 21, 2025.

* cited by examiner

400

Bot: How can I help you?

From Caller Device: Um
　　　　　　　　　　Create a rental reservation

Bot: What is the claim number?

From Caller Device: Just a moment
　　　　　　　　　　1 2 3 ... 4 5 6

Bot: [generated but not sent] I have the first six digits of the claim number as 1 2 3 4 5 6.

From Caller Device: 7 8 9

**Bot: Ok. I have the claim number.
What is your phone number?**

From Caller Device: [spoken softly] What's your phone number?
　　　　　　　　　　5 5 5 2 2 2 3 3 3 3

**Bot: Ok. I have the phone number.
What is your branch ID?**

From Caller Device: [different speaker] What are you doing this weekend?

FIG. 4

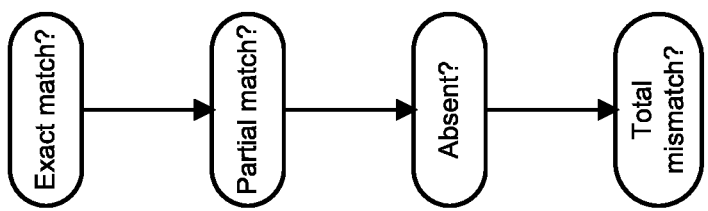
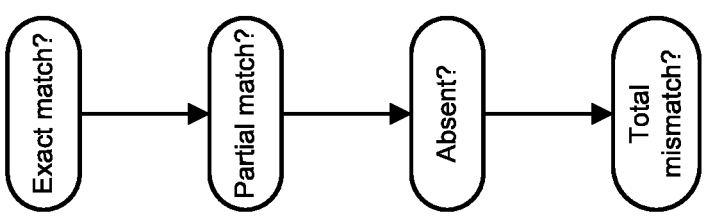
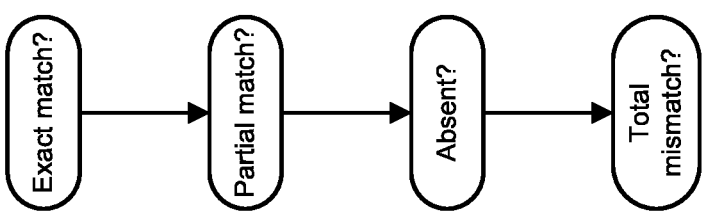
FIG. 7

▶ 23045749-6df1-49c6-84b6-01d1fd1c5243 [641024] message

Turn:
▶ 8cfec4b31f314833b4113f9e04016b6f

Speech-to-Text Results: (0.7375886) [More...] ←—1042

Company B

Actual:
▶ 0:00 / 0:01 ———————————

Luis Processed Utterance:
{
  "text": "company b",
  "intents": {
    "Utility": {
      "score": 0.997887
    },
    "Intention": {
      "score": 0.98638165
    }
  },
  "entities": {
    "$instance": {
      "KnownBusinessName": {

Speech-to-Text Results

1060

```
{
  "Confidence": 0.7375996,
  "Lexical": "company b",
  "ITN": "company b",
  "MaskedITN": "company b",
  "Display": "Company B"
},
{
  "Confidence": 0.419802517,
  "Lexical": "company b's",
  ...
```

FIG. 10D

AUDIO HANDLER FOR INTELLIGENT VOICE INTERFACE

CROSS-REFERENCE TO RELATED APPLICATIONS

This claims the benefit of U.S. Patent Application No. 63/224,698, filed Jul. 22, 2021, and U.S. Patent Application No. 63/231,376, filed Aug. 10, 2021. The entire disclosure of each of the above-identified applications is hereby incorporated by reference herein in its entirety.

TECHNICAL FIELD

Systems and methods are disclosed relating to intelligent voice interfaces, including techniques for improving user experience when interacting with an intelligent voice interface, and techniques for evaluating the performance of an intelligent voice interface.

BACKGROUND

Automated voice interfaces are commonly used by various entities (e.g., commercial companies) in order to service callers (e.g., customers) while avoiding or reducing the costs associated with human operators or representatives. For example, such voice interfaces may be used to handle insurance customers calling to check on the status of their claims, airline customers checking flight status, retail customers placing orders, and so on. Most frequently, simple menu-driven voice interfaces ("interactive voice response" or "IVR" systems) may be used to sequentially guide callers through a predetermined set of menu selections (e.g., "Press 1 to start a new claim, press 2 to check the status of an existing claim," etc.).

More recently, some entities have begun to use more intelligent "voicebots" (also referred to herein as simply "bots"). Voicebots may use natural language processing in order to understand, to some extent, the intended meanings of words spoken by callers. While conventional voicebot systems may be less restrictive than IVR systems (e.g., by not restricting callers to simply saying and/or entering menu numbers or other highly specific statements/entries), they still tend to run into trouble when the caller's dialog is less formal and more conversational. For example, conventional voicebots may require a highly ordered sequence of caller inputs. If a conventional voicebot asks for a caller's phone number and the caller instead provides a residential address, for instance, the voicebot may become confused or ignore the caller's comment. Moreover, conventional voicebots tend to be easily thrown off course by common caller behaviors such as lengthy pauses or stalling language (e.g., "um . . . " or "let's see here . . . "), imprecise identifications (e.g., "a '04 Chevy" rather than "a 2004 Chevrolet Silverado 1500"), and/or side conversations (e.g., the caller speaking to a nearby person, or a nearby person speaking).

Undoubtedly, one reason that conventional voicebots may not be able to adequately handle conversational/real-world caller dialog is that the evaluation of voicebot performance tends to be very time consuming and, in some respects, highly subjective. Typically, for example, the evaluation process may require reviewers to listen to many conversations in order to identify a sufficiently sized sample of "problem calls" (e.g., calls that did not lead to a desired result from the perspective of the caller and/or the entity providing the voicebot). Even if these "problem calls" are successfully identified, the reviewers may have a hard time assessing precisely what went wrong in a given call. For example, it may be difficult for the reviewing listener to assess whether the voicebot misinterpreted the caller's meaning, did not register ("hear") the caller's words, was programmed with an improper response to the caller's statement, and so on. Without a deep understanding of which calls were problematic, and the precise reason why those calls were problematic, those designing or updating voicebot software may lack clear guidance regarding how to best improve performance.

BRIEF SUMMARY

This summary is provided to introduce a selection of concepts in a simplified form that are further described in the Detailed Description section. This summary is not intended to identify key features or essential features of the claimed subject matter, nor is it intended to be used to limit the scope of the claimed subject matter.

In one aspect, a computer-implemented method for identifying relevant caller dialog with an intelligent voice interface may be provided. The intelligent voice interface may be configured to lead callers through pathways of an algorithmic dialog that includes one or more available voice prompts for requesting caller information. The method may include, during a voice communication with a caller via a caller device: (1) receiving from the caller device, by one or more processors implementing the intelligent voice interface, caller input data indicative of a voice input of the caller; (2) determining, by the one or more processors processing the caller input data, that (i) a first portion of the voice input is intended to convey caller information to the intelligent voice interface, and (ii) a second portion of the voice input is not intended to convey caller information to the intelligent voice interface; (3) identifying, by the one or more processors, relevant caller information by analyzing the first portion of the voice input without the second portion of the voice input; and/or (4) one or both of (i) storing, by the one or more processors, the relevant caller information in a database, and (ii) selecting, by the one or more processors, a pathway through the algorithmic dialog based upon the relevant caller information. The method may include additional, fewer, and/or alternate actions, including those discussed elsewhere herein.

In another aspect, an intelligent voice interface system may include one or more processors and one or more memories storing instructions of an intelligent voice interface, wherein the intelligent voice interface is configured to lead callers through pathways of an algorithmic dialog that includes one or more available voice prompts for requesting caller information. The instructions, when executed by the one or more processors, may cause the one or more processors to, during a voice communication with a caller via a caller device: (1) receive from the caller device caller input data indicative of a voice input of the caller; (2) determine, by processing the caller input data, that (i) a first portion of the voice input is intended to convey caller information to the intelligent voice interface, and (ii) a second portion of the voice input is not intended to convey caller information to the intelligent voice interface; (3) identify relevant caller information by analyzing the first portion of the voice input without the second portion of the voice input; and/or (4) one or both of (i) store the relevant caller information in a database and (ii) select a pathway through the algorithmic dialog based upon the relevant caller information.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts a particular embodiment of a particular aspect of the disclosed system and methods.

FIG. 4 depicts an exemplary voice communication, including pauses and a side conversation, that may be properly understood by the intelligent voice interface disclosed herein.

FIG. 7 depicts an exemplary fuzzy matching process flow that may be implemented by the intelligent voice interface disclosed herein.

FIGS. 10A-10D depict exemplary screens of a user interface that may be generated by the call review tool disclosed herein.

Figure 1:
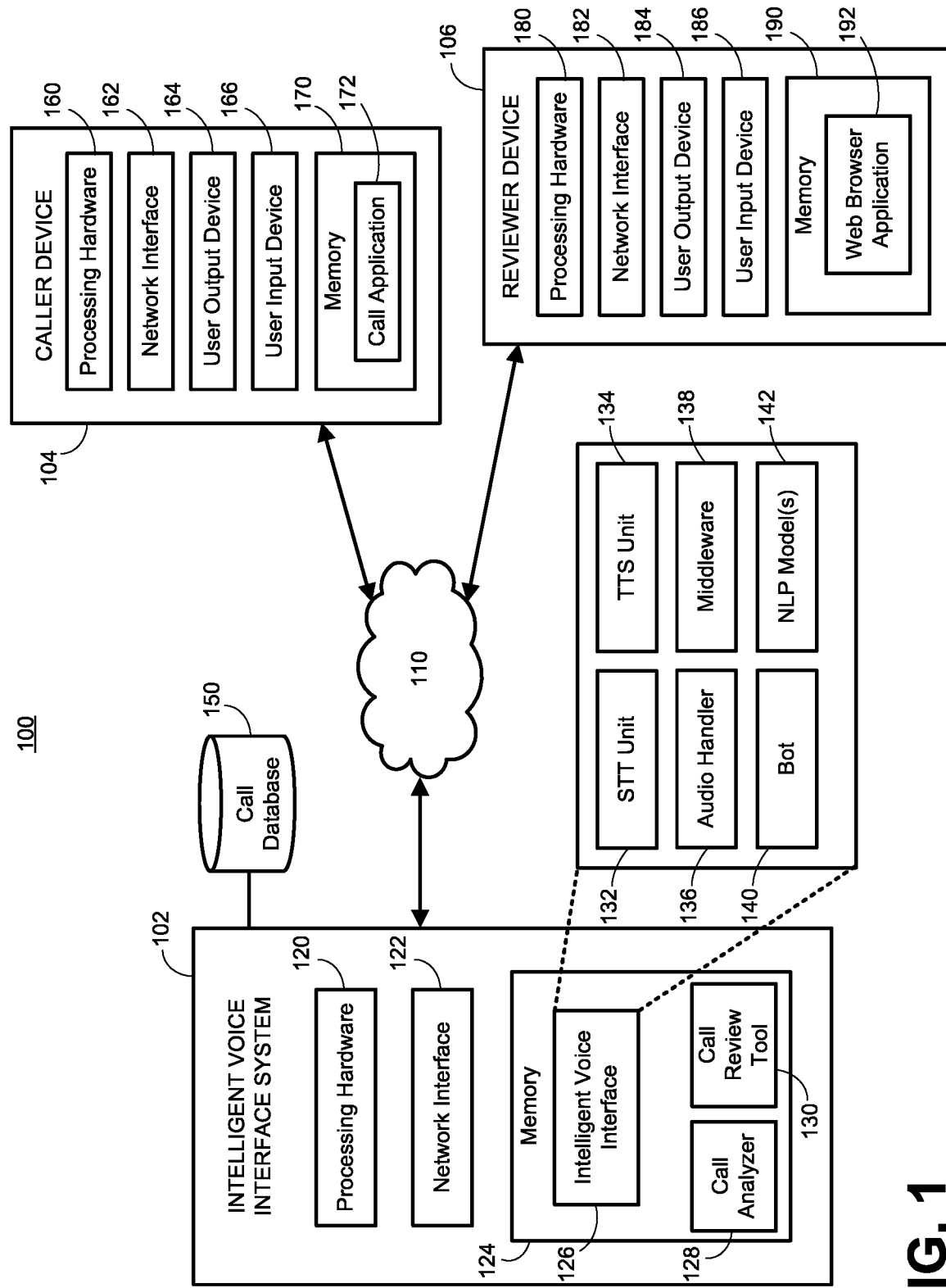
FIG. 1 is a simplified block diagram of an exemplary computer system for implementing and/or evaluating an intelligent voice interface.

The Figures depict aspects of the present invention for purposes of illustration only. One skilled in the art will readily recognize from the following discussion that alternate aspects of the structures and methods illustrated herein may be employed without departing from the principles of the invention described herein.

DETAILED DESCRIPTION

Disclosed herein are systems and methods that improve the performance of an intelligent voice interface. As used herein, the term "intelligent voice interface" may refer to a voicebot (i.e., the software providing or accessing the algorithms, models, etc., that are implemented in order to conduct a voice dialog with a caller), or to a voicebot in combination with other supporting software (e.g., an audio handler and/or middleware as discussed below). Similarly, as used herein, the term "intelligent voice interface system" may refer to the hardware that implements an intelligent voice interface (e.g., including memory storing the instructions of the intelligent voice interface, and the processor(s) configured to execute those instructions).

Some aspects and embodiments disclosed herein enable an intelligent voice interface to better handle less formal, more conversational styles of caller speech, and/or to better handle other real-world factors that can confuse conventional voicebots. In one such aspect/embodiment, pre-processing or "audio handling" of the intelligent voice interface reduces the likelihood of a voicebot becoming confused by extraneous or irrelevant audio information (e.g., side conversations or pauses by the caller), and/or helps the voicebot seamlessly communicate with the user despite such information. In another aspect/embodiment, the intelligent voice interface may handle out-of-sequence dialog from the caller (e.g., if the caller is prompted for certain information but also, or instead, provides other information), rather than being confused by or ignoring/discarding such dialog.

In yet another aspect/embodiment, the intelligent voice interface may infer a state of the user (e.g., the user's emotional state) from non-textual characteristics of the caller's speech, such as how quickly the caller is speaking, or changes in the pitch of the caller's voice, etc., and alter the course of the conversation accordingly (e.g., by transferring a frustrated or angry caller to a human representative). In another aspect/embodiment, the intelligent voice interface may better determine which entity a caller is referring to (e.g., which specific vehicle, person, place, etc.), even when the caller provides information that only imperfectly matches information stored in records. In another aspect/embodiment, the intelligent voice interface may effectively translate voice communications from a user into a particular format (e.g., to different words/terminology, or in accordance with a maximum message duration, etc.) that can be understood by a personal voice assistant (e.g., a conventional personal voice assistant, such as Alexa or Ski), to facilitate the user's interactions with his or her social network on a social network platform (e.g., Sundial, Facebook, LinkedIn, Twitter, etc.).

Other aspects and embodiments disclosed herein relate to a call review tool that enables the manual review of calls by users, and facilitates improvements to existing intelligent voice interfaces. In one such aspect/embodiment, the call review tool enables a user to not only listen to raw call audio and view the text transcript of the dialog from each call, but also view "metadata" associated with each call. For example, the user interface may show the results of automated evaluations/ratings so that a user can quickly identify "problem calls" that reflect poor voicebot performance (and/or undesired business results, etc.). For any given call, the user interface may present various event labels (i.e., labels indicative of particular types of events), such as labels indicative of natural language processing (NLP) model outputs (e.g., outputs that the voicebot used to determine caller intents), outputs of other machine learning models that were used to perform post-call analyses on the calls, and/or other information that might facilitate a deeper understanding of what happened during the calls. This deeper understanding may, in turn, provide valuable insights into precisely how the performance of the intelligent voice interface might be improved (e.g., by modifying heuristic algorithms/rules, training or refining certain NLP models, etc.).

Exemplary Intelligent Voice Interface System

FIG. 1 is a simplified block diagram of an exemplary computer system 100 for implementing and/or evaluating an intelligent voice interface. The system 100 may include an intelligent voice interface system 102 (also referred to herein as "IVI system 102"), a caller device 104, and a reviewer device 106, some or all of which are communicatively coupled via a network 110. The network 110 may be a single communication network, or may include multiple communication networks of one or more types (e.g., a cellular network, the Internet, one or more wired and/or wireless local area networks, etc.).

The IVI system 102, and some or all of the network 110, may be maintained by a commercial company (e.g., insurance company, retail sales company, etc.), a hospital, a university, a government agency, or any other type of institution or entity that has use for (or otherwise provides the services of) an intelligent voice interface. The IVI system 102 may be any computing device or system, such as a server, for example. Generally, the IVI system 102 obtains caller input data indicative of the voice input of a caller associated with the caller device 104 (e.g., the caller's raw voice data or, in some embodiments, a text translation of the caller's voice data), processes the caller input data to determine one or more intents of the caller, and (in at least some embodiments/scenarios) generates a voice response (e.g., a follow-up prompt/question, a confirmation, an instruction, etc.) and provides the voice response to the caller device 104. A caller "intent" may be an intent expressly stated in the caller's dialog (e.g., a specific phone number that the caller provides in response to a prompt from the IVI system 102), or an intent inferred from the caller's dialog by the IVI system 102 (e.g., inferring that the caller is answering affirmatively when saying "well I don't see why not," etc.).

The IVI system 102 may be a single computing device, or may comprise a collection of distributed (i.e., communicatively coupled local and/or remote) computing devices and/or systems, depending on the embodiment. The IVI system 102 may include processing hardware 120, a network interface 122, and a memory 124. The processing hardware 120 may include one or more processors, each of which may be a programmable microprocessor that executes software instructions stored in the memory 124 to execute some or all of the functions of the IVI system 102 as described herein. The processing hardware 120 may include one or more central processing units (CPUs) and/or one or more graphics processing units (GPUs), for example. In some embodiments, however, a subset consisting of one or more of the processors in the processing hardware 120 may include other types of processors (e.g., application-specific integrated circuits (ASICs), field-programmable gate arrays (FPGAs), etc.). In some embodiments, the intelligent voice interface 126 uses concurrent processing techniques across multiple CPU cores and/or threads (i.e., multi-thread and/or multi-core processing).

The network interface 122 may include any suitable hardware (e.g., front-end transmitter and receiver hardware), firmware, and/or software configured to use one or more communication protocols to communicate with external devices and/or systems (e.g., with the caller device 104 and other, similar caller devices not shown in FIG. 1) via the network 110. For example, the network interface 122 may include a cellular network interface and/or an Ethernet interface.

The memory 124 may include one or more volatile and/or non-volatile memories. Any suitable memory type or types may be included in the memory 124, such as a read-only memory (ROM) and/or a random access memory (RAM), a flash memory, a solid-state drive (SSD), a hard disk drive (HDD), and so on. Collectively, the memory 124 may store the instructions of one or more software applications, the data received/used by those applications, and the data output/generated by those applications. In particular, the memory 124 stores the software instructions of an intelligent voice interface 126, a call analyzer 128, and a call review tool 130.

The intelligent voice interface 126 of FIG. 1 generally handles voice communications with callers, and may include a speech-to-text (STT) unit 132, a text-to-speech (TTS) unit 134, an audio handler 136, middleware 138, a bot 140, and one or more NLP models 142. The STT unit 132 converts raw voice data files to text, and the TTS unit 134 converts text to (synthesized) voice data files. Generally, the bot 140 uses the NLP model(s) 142, and possibly other rules, algorithms, and/or models, to determine caller intents from caller statements (after those statements are converted to text by the STT unit 132, and possibly after pre-processing by the audio handler 136 and/or middleware 138). The bot 140 also generates appropriate responses (e.g., confirmations, follow-up questions, etc.), and provides those responses to the TTS unit 134 (possibly after filtering or other processing by the middleware 138) for conversion to voice (e.g., a synthesized voice) and delivery to the appropriate caller devices. While referred to herein in the singular, the bot 140 may include multiple bots (e.g., different bots that specialize in different dialogs or portions of dialogs, or in determining different intents, etc.). The intelligent voice interface 126 may include additional units, fewer units (e.g., if the STT unit 132 and/or TTS 134 are implemented elsewhere), and/or alternate units, in other embodiments.

In some embodiments, the NLP model(s) 142 (and possibly some or all of the bot 140 itself) reside on another computing system, such as a remote server. For example, the bot 140 may access a cloud-based artificial intelligence service (e.g., Microsoft Azure, Amazon Comprehend, etc.) in order to use the NLP model(s) 142. As another example, the bot 140 itself may be a remotely hosted bot that is accessed by the intelligent voice interface 126 (e.g., via the middleware 138).

The call analyzer 128 generally identifies "events" associated with different calls between callers and the intelligent voice interface 126, in real-time during a call and/or during post-call analysis depending on the embodiment, and adds corresponding event labels to the calls (or to portions thereof). The call analyzer 128 may also, or instead, evaluate each call to generate a rating for that call (e.g., "successful" or "unsuccessful," or a numeric score, etc.). The call review tool 130 generally provides a user interface that enables reviewers (e.g., the reviewer using the reviewer device 106) to manually review calls and, in some embodiments, manually add event labels associated with those calls. The operation of the intelligent voice interface 126, call analyzer 128, and call review tool 130 is discussed in further detail below, according to various embodiments.

The IVI system 102 may add data associated with calls handled by the intelligent voice interface 126, such as raw voice data files, text transcripts of those raw voice data files, data generated by the call analyzer 128 (e.g., event labels), and data manually added via the call review tool 130 (e.g., manual event labels), to a call database 150. The call database 150 may be stored in any suitable persistent memory (e.g., within the memory 124) or collection of persistent memories (e.g., distributed across a number of local and/or remote devices and/or systems). The call database 150 may include data associated with thousands of calls from different callers, for example.

While some embodiments allow many callers and caller devices to access the intelligent voice interface 126 of the IVI system 102, for clarity FIG. 1 illustrates only the example caller device 104 of a single caller. The caller device 104 is a computing device of a remote human caller (e.g., a customer, patient, applicant, etc.), such as a smart phone, a tablet, a desktop or laptop computer, a smart watch or other wearable electronic device, etc. Generally, the caller operates the caller device 104 to contact/access the IVI system 102 for a specific purpose, such as checking the status of or opening an insurance claim, checking the status of or placing an order, scheduling an appointment, and so on.

The caller device 104 may include processing hardware 160, a network interface 162, a user output device 164, a user input device 166, and a memory 170. The processing hardware 160 may include one or more CPUs and/or one or more GPUs, for example, and the network interface 162 may include any suitable hardware, firmware, and/or software configured to use one or more communication protocols to communicate with external devices and/or systems (e.g., the IVI system 102) via the network 110. The user output device 164 may include one or more speakers to present audio information to the caller, and the user input device 166 may include one or more microphones that enable the caller to input audio information. In some embodiments, the caller device 104 may also include one or more other output and/or input devices. For example, the caller device 104 may include a touchscreen that enables the caller to view a virtual keypad and enter a phone number associated with the IVI system 102 in order to establish the initial connection with the IVI system 102. In some embodiments, the caller device 104 comprises two or more units or devices that are communicatively coupled to each other (e.g., a laptop and a headset with microphone and speakers that communicate with each other via Bluetooth).

The memory 170 may include one or more volatile and/or non-volatile memories (e.g., ROM and/or RAM, flash memory, SSD, HDD, etc.). Collectively, the memory 170 may store the instructions of one or more software applications, the data received/used by those applications, and the data output/generated by those applications. In the example embodiment of FIG. 1, the memory 170 stores the software instructions of a call application 172, which the user accesses to initiate a telephone call with the IVI system 102. The call application 172 may be a web browser application that supports calls over Internet Protocol, or the native software of a smart phone that supports cellular calls, for example. In still other embodiments, the caller device 106 is an analog device that generates an analog voice signal responsive to the caller's voice, such as a rotary telephone (e.g., with units 160, 170, and 172 being omitted).

The reviewer device 106 may be a computing device of a user of the system 100 (e.g., an employee of the entity maintaining the IVI system 102), who may be nearby or remote from the IVI system 102. Generally, a user of the reviewer device 106 uses the reviewer device 106 to assess/evaluate calls between callers (e.g., callers associated with caller devices such as device 104) and the intelligent voice interface 126. The reviewer device 106 may include processing hardware 180, a network interface 182, a user output device 184, a user input device 186, and a memory 190. The processing hardware 180 may include one or more CPUs and/or one or more GPUs, for example, and the network interface 182 may include any suitable hardware, firmware, and/or software configured to use one or more communication protocols to communicate with external devices and/or systems (including the IVI system 102) via the network 110. The user output device 184 may use any suitable display technology (e.g., LED, OLED, LCD, etc.) to present information to the user, and the user input device 186 may include a keyboard, a mouse, a microphone, and/or any other suitable input device or devices. In some embodiments, the user output device 184 and the user input device 186 are at least partially integrated within a single device (e.g., a touchscreen display). Generally, the user output device 184 and the user input device 186 may collectively enable the user to view and/or interact with visual presentations (e.g., graphical user interfaces or other displayed information) generated by the reviewer device 106. Some example user interface screens are discussed below with reference to FIGS. 10A-10D.

The memory 190 may include one or more volatile and/or non-volatile memories (e.g., ROM and/or RAM, flash memory, SSD, HDD, etc.). Collectively, the memory 190 may store the instructions of one or more software applications, the data received/used by those applications, and the data output/generated by those applications. In the example embodiment of FIG. 1, the memory 190 stores the software instructions of a web browser 192, which the user may launch and use to access the call review tool 130 of the IVI system 102. More specifically, the user may use the web browser 192 to visit a website with one or more web pages, which may include HyperText Markup Language (HTML) instructions, JavaScript instructions, JavaServer Pages (JSP) instructions, and/or any other type of instructions suitable for defining the content and presentation of the web page(s). Responsive to user inputs, the web page instructions may interact with the call review tool 130 in order to access its functionality as discussed in further detail below.

In other embodiments, the reviewer device 106 accesses the call review tool 130 by means other than the web browser 192, and/or the call review tool 130 resides in a device or system other than the IVI system 102. For example, the call review tool 130 and possibly the call analyzer 128 may instead be stored in the memory 190 of the reviewer device 106, and the reviewer device 106 may directly access the call database 150 as needed to support the call review tool 130 and/or the call analyzer 128. In still other embodiments, the system 100 does not include the reviewer device 106. For example, the reviewing user may instead directly operate the IVI system 102 in order to access the call review tool 130 (e.g., with the user output device 184 and the user input device 186 being components of the IVI system 102 rather than a separate device).

Exemplary Call Process Flow with Intelligent Voice Interface

Figure 2:
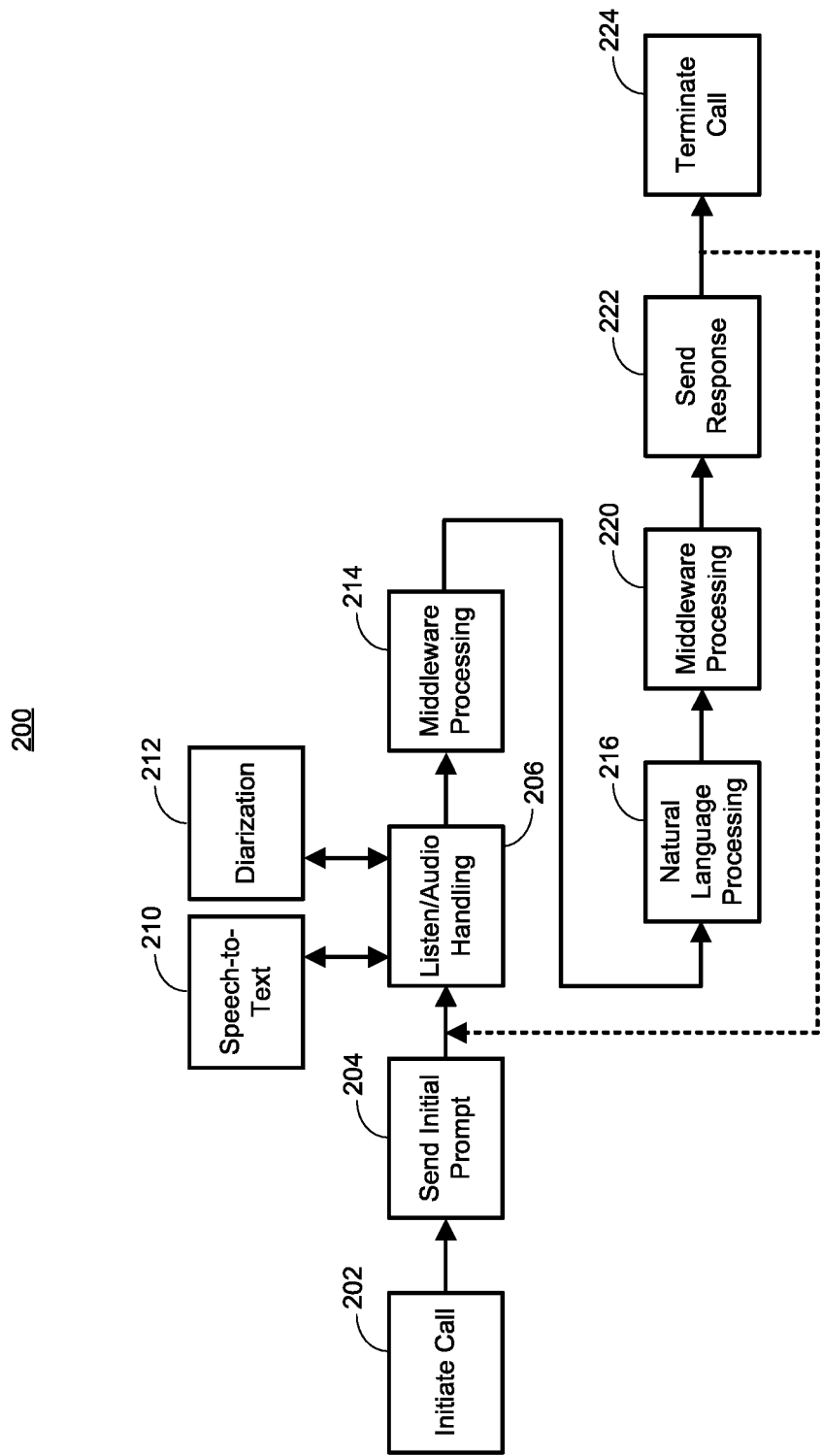
FIG. 2 depicts an exemplary call process flow that may be implemented by the intelligent voice interface disclosed herein.

FIG. 2 depicts an exemplary call process flow 200 that may be implemented by an intelligent voice interface, such as the intelligent voice interface 126 of FIG. 1. For ease of explanation, the process flow 200 will be described below with specific reference to the intelligent voice interface 126 and other components of the computer system 100.

At stage 202, when the caller uses the caller device 104 to contact the IVI system 102, the intelligent voice interface 126 initiates a "call" or session with the caller. Initiating a call may include retrieving and starting an algorithm that leads the caller through a dialog that can dynamically change based on a caller's voice inputs (also referred to herein as an "algorithmic dialog").

Subsequently, at stage 204, the bot 140 of the intelligent voice interface 126 sends an initial prompt to the caller device 104, in order to request specific information (e.g., the caller's name, claim number, etc.). While not shown in FIG. 2, the bot 140 may also (prior to stage 204) send an introductory statement or set of statements to the caller device 104, such as a statement welcoming the caller. While not shown in FIG. 2, the TTS unit 134 converts the initial prompt (and any preceding statement(s)) to a synthesized voice message, which the IVI system 102 then sends to the caller device 106 via the network 110.

At stage 206, the bot 140 listens for the caller's response to the prompt. While the bot 140 listens, the audio handler 136 filters and/or otherwise pre-processes the raw audio signal at stage 206. Concurrently, at stage 210, the speech-to-text unit 132 converts the caller's speech (e.g., the audio signal that remains after processing/filtering by the audio handler 136) to text that is cognizable by the bot 140. In some embodiments, the speech-to-text unit 132 is omitted (e.g., in embodiments where the caller device 104, or an intervening device not shown in FIG. 1, converts the caller's speech to text).

In the embodiment shown in FIG. 2, the audio handler 136 can filter out audio that represents statements made by anyone other than the caller (i.e., someone who is physically proximate to the caller) at stage 206. To this end, the audio handler 136 or another component of the intelligent voice interface 126 concurrently (at stage 212) performs diarization to identify who is speaking. Stage 212 may include comparing characteristics of a voice to known characteristics of the caller's voice (e.g., if such characteristics were previously stored in a memory such as the memory 124), or determining characteristics of the voice initially heard by the intelligent voice interface 126 (presumably the caller's voice) and then determining whether and when those characteristics change. In other embodiments, stage 212 is omitted.

In addition or alternatively, in some embodiments, stage 212 may include the audio handler 136 filtering out audio that represents a side statement the caller made to someone else who is physically proximate to the caller (or to him/herself), and/or performing other pre-processing. Stage 212 may also, or instead, include other pre-processing by the audio handler 136, such as the application of one or more noise suppression techniques (e.g., to reduce static or wind noise during a call).

At stage 214, the middleware 138 may process the output from the audio handler 136 and STT unit 132 (i.e., the "cleaned" text data). The middleware 138 may generally provide higher-level interpretive or other management functions for the bot 140. For example, the middleware 138 may, at stage 214, determine that a particular utterance of the caller is irrelevant and likely to confuse the bot 140, and therefore withhold the utterance from the bot 140. In some embodiments and/or scenarios, however, stage 214 is omitted.

At stage 216, the bot 140 uses at least one of the NLP model(s) 142 to process/interpret the cleaned text data (after the higher-level filtering or other modifications by the middleware 138, if any). Stage 216 may include the bot 140 using the NLP model(s) 142 to determine one or more intents of the caller based on the cleaned text data. In general, the bot 140 may attempt to identify intents that correspond to any type of information relevant to the algorithmic dialog (e.g., the caller's name, claim number, or phone number, a request for a particular type of service, a request for help from a human representative, etc.). Stage 216 may also include the bot 140 determining/generating a response message to the caller based on the intent(s) identified using the NLP model(s) 142. The response message may be a confirmation or acknowledgment (e.g., "Ok, I have your claim number"), a follow-up prompt (e.g., "Are you calling to check the status of this claim?"), or another response to the caller.

At stage 220, the middleware 138 may receive the response message from the bot 140, or other data indicative of the response message (e.g., data indicating that the bot 140 has generated a timeout response message), and either allow the IVI system 102 to send the response message to the caller (at stage 222), or take some action before the response message is sent. For example, the middleware 138 may hold the response message from the bot 140 for a predetermined time, and discard the response message if one or more conditions are satisfied within some predetermined time limit (e.g., to avoid re-prompting the caller prematurely, as in the example scenario of FIG. 4 discussed below). As another example, the middleware 138 may hold the response message from the bot 140 for a predetermined time, and forward the response message to the caller (at stage 222) only if one or more conditions are satisfied within some predetermined time (e.g., only if the middleware 138 "agrees" with the response of the bot 140). In some embodiments and/or scenarios, stage 222 is omitted.

Stage 222 may include the TTS unit 134 converting the text response generated by the bot 136 (and possibly modified by the middleware 138) to a voice message (e.g., a synthesized voice message) prior to transmission to the caller device 104. In other embodiments, the response message is converted to speech by the caller device 104, or by an intervening device not shown in FIG. 1.

After the IVI system 102 sends the response message to the caller device 104 (e.g., in scenarios where the middleware 138 does not discard the response message), the intelligent voice interface 126 may either return to stage 206 (e.g., if the response message was a follow-up question to the caller), or proceed to terminate the call at stage 224 (possibly with additional messages to the caller to definitively and politely end the call, etc.). While not shown in FIG. 2, the call process flow 200 may also include other stages. For example, the intelligent voice interface 126 may trigger other actions based on the callers response(s), such as by causing a computing system to update records (e.g., in a claims database) or by causing the caller to be transferred to a human representative. Moreover, in some embodiments and/or scenarios, the call may include a different order of operation (e.g., with a caller providing certain information before the initial prompt at stage 204, such as the scenario discussed below with reference to FIG. 5B).

Exemplary Algorithmic Dialog and Conversational Dialog Scenarios

Figure 3:
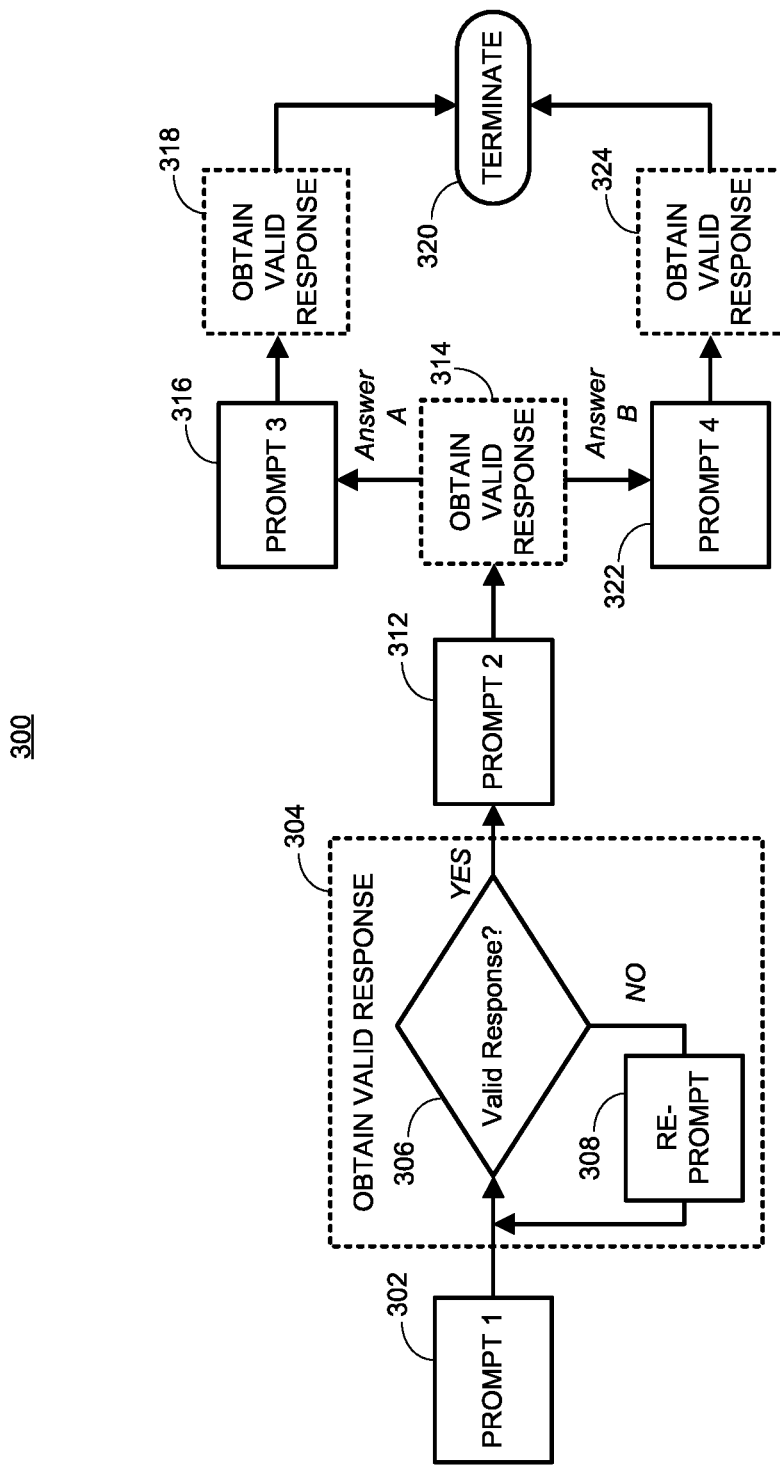
FIG. 3 depicts an exemplary algorithmic dialog that may be implemented by the intelligent voice interface disclosed herein.

FIG. 3 depicts an exemplary algorithmic dialog 300 that may be implemented by an intelligent voice interface, such as the intelligent voice interface 126 of FIG. 1. While the algorithmic dialog 300 as shown in FIG. 3 may appear similar to the types of algorithmic dialogs offered by conventional voice response systems and voicebots, the example is introduced here primarily for later reference when discussing certain novel aspects of the intelligent voice interface. For ease of explanation, the algorithmic dialog 300 will be described below with specific reference to the intelligent voice interface 126 and other components of the system 100. Depending on the embodiment, the algorithmic dialog 300 (i.e., the selections of pathways through the algorithmic dialog 300) may be controlled entirely by the bot 140, or may be controlled by the bot 140 with external input (e.g., from the middleware 138).

Initially, at stage 302 of the algorithmic dialog 300, the intelligent voice interface 126 generates a first voice prompt to the caller, which the IVI system 102 sends to the caller device 104. At stage 304, the intelligent voice interface 126 obtains a valid caller response to the prompt. Stage 304 may include the intelligent voice interface 126 listening to the caller's audio input (e.g., caller utterances, background noise, silence, etc.) and determining (at stage 306) whether the audio input represents a valid response (e.g., based on outputs of the NLP model(s) 142). If so, the intelligent voice interface 126 proceeds to stage 312. If not (e.g., if the caller says nothing), stage 304 may include the intelligent voice interface 126 re-prompting the caller at stage 308 (e.g., "I'm sorry I didn't understand—please enter your ten-digit phone number").

At stage 312, the intelligent voice interface 126 generates a second, follow-up voice prompt to the caller, and the IVI system 102 sends the second voice prompt to the caller device 104. At stage 314, the intelligent voice interface 126 obtains a valid caller response to the second prompt (e.g., similar to stage 304). In the example shown, the caller's (valid) response at stage 314 determines whether the intelligent voice interface 126 selects a first pathway (to stage 316) or a second pathway (to stage 322) of the algorithmic dialog 300. Stages 316 and 322 may be similar to stage 302 or 312 (but with different queries/prompts), and are followed by respective stages 318 and 324, which may be similar to stages 304 and 314, respectively. At stage 320, the intelligent voice interface 126 terminates the call, or otherwise causes the call to be terminated.

While the algorithmic dialog 300 represents a relatively simple set of dialog stages and pathways, it is understood that virtually any configuration is possible, including far more complex configurations. For example, the algorithmic dialog 300 may include many more pathways and/or stages, and/or certain pathways may include one stage feeding back into an earlier stage, etc. As another example, the algorithmic dialog 300 may include the intelligent voice interface 126 sending an acknowledgment or confirmation request after each of stages 304, 314, 318, and 324. As used herein, an "algorithmic dialog" can refer to the stages/pathways for a specific portion of a call (e.g., only after the user has selected an initial option), or to the stages/pathways for an entire call (possibly including multiple, lower-level algorithmic dialogs arranged hierarchically, etc.).

The intelligent voice interface 126 may also trigger various actions not directly related to the algorithmic dialog pathway (and not shown in FIG. 3), based on the caller's responses or lack thereof. For example, "Prompt 1" may ask the caller to state the claim number, and the intelligent voice interface 126 may cause the provided claim number to be used as a key to a database (e.g., in a separate claims information system) after stage 304. As another example, "Prompt 2" may ask the caller whether he/she would like to check the status of a retail order or cancel the order, and the intelligent voice interface 126 may trigger the action indicated by the caller ("check status" or "cancel") after stage 318 or stage 324.

FIG. 4 depicts an exemplary voice communication 400 reflecting real-world scenarios (e.g., caller pauses and side conversations) that may be properly handled with the assistance of the audio handler 136 and middleware 138. For ease of explanation, the voice communication 400 will be described below with specific reference to the intelligent voice interface 126 and other components of the system 100.

Initially, the bot 140 of the intelligent voice interface 126 generates the prompt "How can I help you?" (e.g., Prompt 1 of the algorithmic dialog 300) and the IVI system 102 sends the prompt to the caller device 104 (e.g., at a stage similar to stage 302). The intelligent voice interface 126 then listens for a response (e.g., at a stage similar to stage 304). In this example, the audio signal from the caller device 104 includes the utterance "um" and then, a short time later, "create a rental reservation."

The bot 140 (using one of the NLP model(s) 142) determines that the caller intended to pause by saying "um," and therefore ignores the word and waits for the caller to say more. When the caller does follow up with the words "create a rental reservation," the bot 140 recognizes the response (e.g., at a stage similar to stage 304) and takes the corresponding pathway of the algorithmic dialog (e.g., to a stage similar to stage 312). In this example, that pathway includes the bot 140 following up with the prompt "What is the claim number?"

The caller initially responds with "just a moment," which the bot 140 treats in the same way as "um" (i.e., by ignoring the word and waiting for further caller input). The caller then says the first six digits of a nine-digit claim number, with a short pause between the first three digits and the next three digits. In this example, the pause is short enough (e.g., below a predetermined threshold) that the audio handler 136 decides to group the two utterances ("1 2 3" and "4 5 6") as a single statement, and pass that single statement to the bot 140 (directly, or possibly via the middleware 138). However, the caller waits an even longer time between the second set of three digits ("4 5 6") and the last three digits ("7 8 9"), exceeding a threshold of the audio handler 136 for grouping statements, and also exceeding a threshold of the bot 140 for pauses. In response, the bot 140 generates the message "I have the first six digits of the claim number as 1 2 3 4 5 6." However, the bot 140 provides the message to the middleware 138, which holds the message. For example, the middleware 138 may be designed to allow longer pause times than the bot 140 itself (e.g., as measured relative to the time the bot 140 sent the preceding prompt to the caller device 104, the time of the last caller utterance, or the time when the middleware 138 received the "I have the first six digits . . ." message from the bot 140). As a more specific example, the bot 140 may allow a three second pause before re-prompting the caller to provide the information (e.g., at a stage similar to stage 314), while the middleware 138 may allow an extra five seconds of pause time.

In the example shown in FIG. 4, the caller says the last three digits of the claim number ("7 8 9") before the time limit of the middleware 138 has expired. Thus, the middleware 138 discards the message from the bot 140 that it was holding, as the bot 140 has now obtained the full number. In other scenarios, if the caller does not provide the last three digits before the timeout of the middleware 138 expires, the middleware 138 causes the IVI system 102 to forward the held message to the caller.

After the bot 140 acknowledges receipt of the full claim number ("Ok. I have the claim number"), the bot 140 takes the appropriate pathway of the algorithmic dialog (e.g., to a stage similar to stage 316 or 318), which in this example includes the bot 140 following up with the prompt "What is your phone number?" Thereafter, in the audio signal from the caller device 104, the caller responds, at a relatively low volume/loudness, "What's your phone number?" In some embodiments, the audio handler 136 filters out this part of the audio signal in response to determining that the audio signal is very weak in that time span (e.g., is below some predetermined threshold loudness). For example, the audio handler 136 may assume that any audio below the threshold is a "side conversation" not intended for the bot 140. In other embodiments, the bot 140 receives the text of the utterance (from STT unit 132), but also receives an indication from the audio handler 136 that the utterance is associated with a weak or low volume audio signal. For example, the bot 140 may ignore the utterance if and only if both (1) the bot 140 is unable to determine a caller intent from the utterance using the NLP model(s) 142, and (2) the bot 140 receives the "weak/low audio signal" indication from the audio handler 136.

Continuing with the example voice communication 400, the caller then says "5 5 5 2 2 2 3 3 3 3," which the bot 140 recognizes as a telephone number. The bot 140 acknowledges the information ("Ok. I have the phone number.") and then takes the appropriate pathway of the algorithmic dialog, which in this example includes the bot 140 following up with the prompt "What is your branch ID?" Thereafter, in the audio signal from the caller device 104, a voice other than the caller's says "What are you doing this weekend?" In some embodiments, the audio handler 136 filters out this part of the audio signal in response to determining that the voice differs from the voice of the caller (e.g., by comparing audio characteristics of the utterance to known audio characteristics of the caller's voice, with the latter being determined from earlier statements of the caller). In other embodiments, the bot 140 receives the text of the utterance (from STT unit 132), but also receives an indication from the audio handler 136 that the utterance is associated with a speaker other than the caller. For example, the bot 140 may ignore the utterance if and only if both (1) the bot 140 is unable to determine a caller intent from the utterance using the NLP model(s) 142, and (2) the bot 140 receives the "other speaker" indication from the audio handler 136. The remainder of the call (e.g., the caller's eventual response, or the bot 140 issuing another prompt for the branch ID or other information, etc.) is not shown in FIG. 4.

Figure 5A:
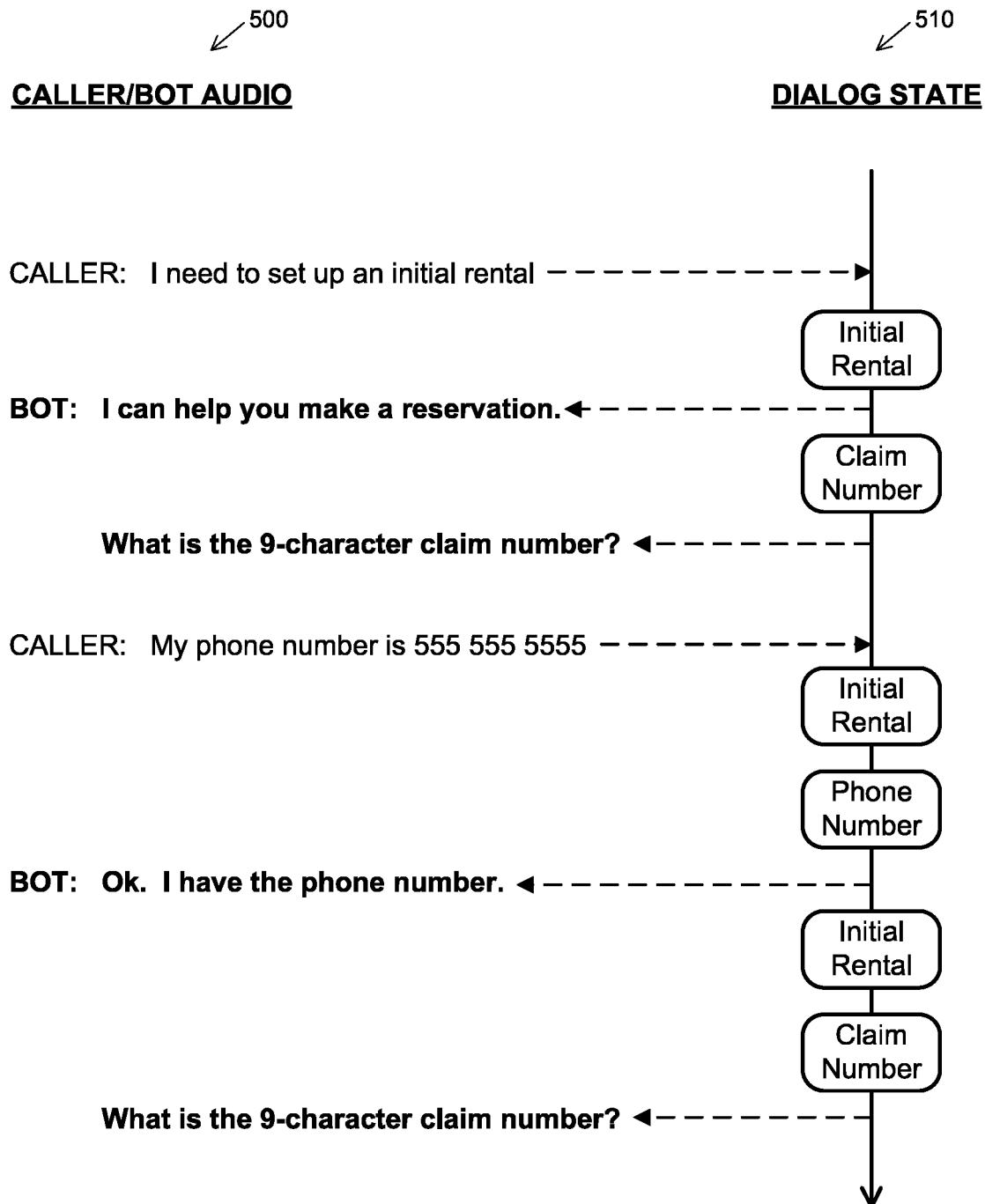
FIGS. 5A-5C depict exemplary voice communications that include out-of-sequence caller statements, and the corresponding states of an algorithmic dialog managed by the intelligent voice interface disclosed herein.
Figure 5B:
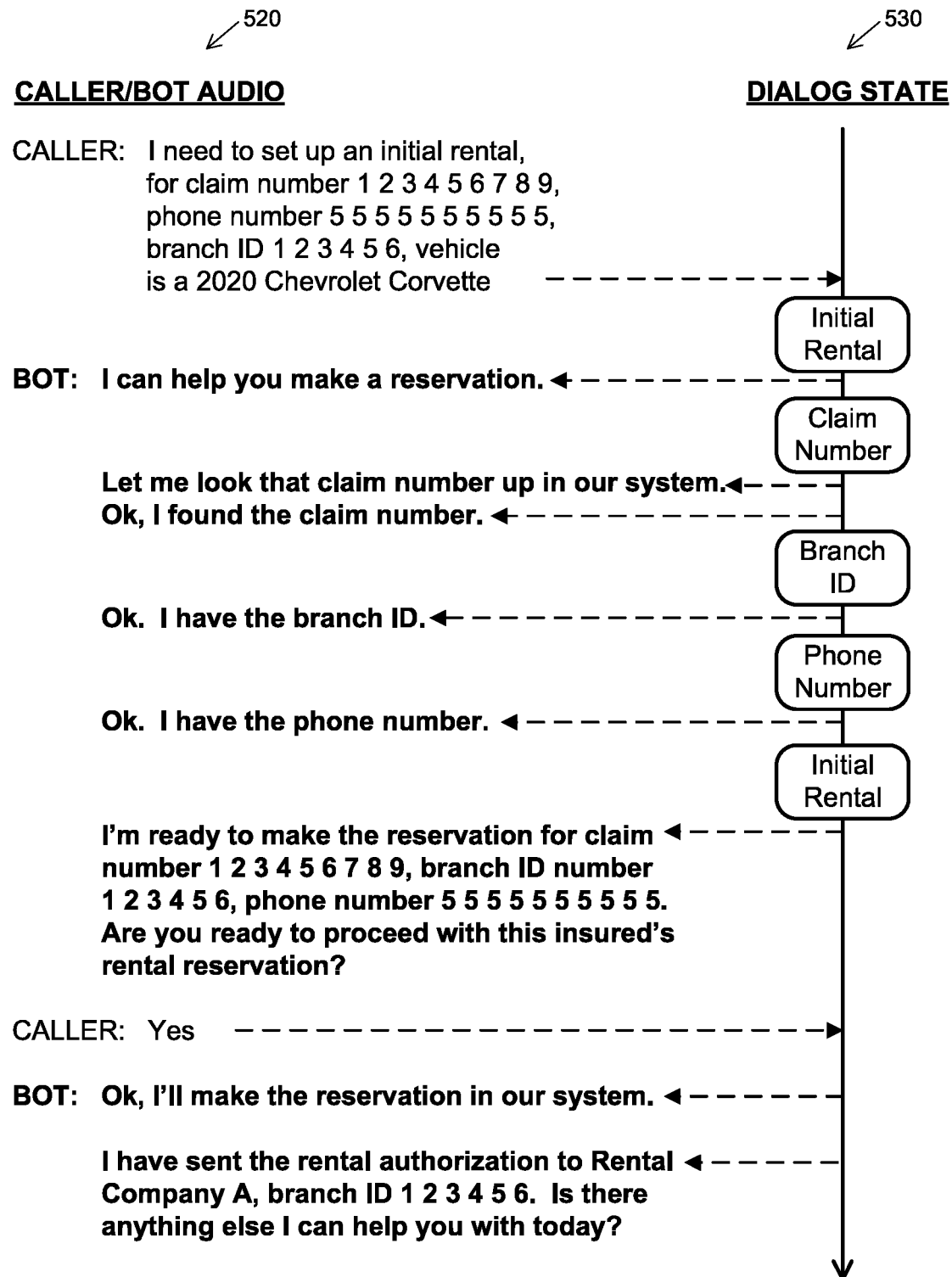
Figure 5C:
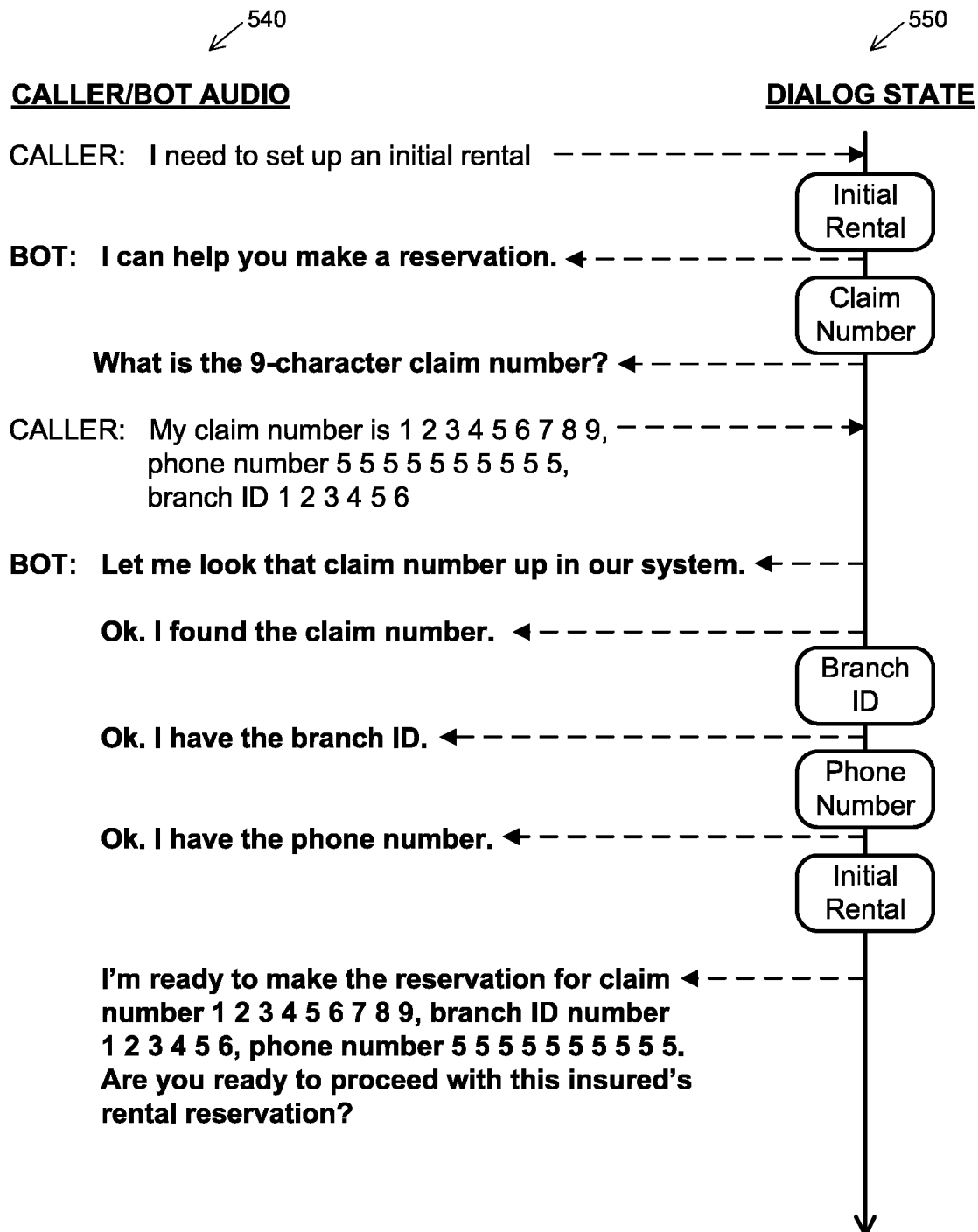

FIGS. 5A-5C depict exemplary voice communications 500, 520, 540 in which the caller provides "out-of-sequence" or "out-of-context" information, and also depict the corresponding states 510, 530, 550 (respectively) of an algorithmic dialog managed by an intelligent voice interface such as the intelligent voice interface 126. For ease of explanation, FIGS. 5A-5C will be described below with specific reference to the intelligent voice interface 126 and other components of the system 100.

The dialog states 510, 530, 550 are software-based states of the bot 140 (or more generally, of the intelligent voice interface 126) when managing an algorithmic dialog such as the algorithmic dialog 300 of FIG. 3. For example, the bot 140 may enter a first dialog state that causes the bot 140 to prompt the caller for a first type of information (e.g., at stage 320 of the algorithmic dialog 300) and listen for the response, and after obtaining a valid response enter a second dialog state that causes the bot 140 to prompt the caller for a second type of information (e.g., at stage 312 of the algorithmic dialog), and so on. The current dialog state of the bot 140 can dictate how the bot 140 interprets a caller statement to determine caller intents, in some embodiments. For example, when receiving a caller utterance, the bot 140 may initially attempt to use a specific NLP model 142 that corresponds to the expected/requested type of information for that dialog state (e.g., an NLP model 142 specialized for the detection of number sequences when the bot 140 has prompted the caller for a phone number), and only try other NLP models 142 if the bot 140 is unable to identify the expected/requested type of information. In each of FIGS. 5A-5C, the dialog state 510, 530, or 550 at the top of the descending vertical timeline is in an initial state (e.g., "New Caller," etc.) not shown in the diagrams.

Referring first to FIG. 5A, in the voice communication 500, the caller initially says "I need to set up an initial rental." The bot 140 interprets the caller's statement using the NLP model(s) 142, and in response to detecting an "initial rental" intent changes to an "Initial Rental" dialog state. In accordance with the algorithmic dialog being executed by the bot 140, the bot 140 confirms the caller's choice ("I can help you make a reservation"), changes to a "Claim Number" dialog state, and prompts the caller for relevant information ("What is the 9-character claim number?"). Because the bot 140 remains in the "Claim Number" state, the bot 140 "expects" to hear a nine-character claim number. Thus, when the caller responds ("My phone number is 555 555 5555"), the bot 140 may first attempt to interpret the statement using an NLP model 142 that specializes in identifying spoken claim numbers (or more generally specializes in identifying spoken number sequences, etc.). In other embodiments, the bot 140 uses the same NLP model 142, or same set of NLP models 142, regardless of the dialog state.

Whereas a conventional voicebot would at best ignore the statement (possibly asking again for the claim number) and at worst be confused by the statement (e.g., attempt to use the phone number as the caller's claim number), the intelligent voice interface 126 can handle the out-of-sequence phone number information provided by the caller. In the embodiment shown in FIG. 5A, for example, the bot 140 determines that the caller instead provided a phone number (e.g., using one of the NLP model(s) 142), and in response cycles back through the "Initial Rental" state and then to a "Phone Number" state. In the "Phone Number" state, the bot 140 processes and accepts the phone number, and generates a confirmation ("OK. I have the phone number."), without prompting the caller for the phone number as would otherwise occur in the "Phone Number" state. In other embodiments, when the bot 140 determines that the caller provided a phone number while in the "Claim Number" state, the bot 140 causes the phone number to be stored in memory for later use (e.g., in the memory 124). For example, the bot 140 may wait until the "Claim Number" dialog state has been exited in response to the caller providing the claim number, and then switch to the "Phone Number" dialog state (but again, without prompting the caller for the phone number as would otherwise occur in the "Phone Number" state).

Returning to the example of FIG. 5A, after providing confirmation of the received phone number, the bot 140 cycles back through the "Initial Rental" state and then back to the "Claim Number" state. In the "Claim Number" state, the bot 150 again prompts the user for the claim number ("What is the 9-character claim number?").

Whereas the voice communication 500 of FIG. 5A represents a scenario in which the caller substitutes one (non-requested) piece of information for another (requested) piece of information, the voice communication 520 of FIG. 5B represents a "power user" scenario in which the caller tries to save time by providing multiple pieces of information at the outset of the call, possibly before receiving any prompt (and/or any introductory message) from the bot 140. For instance, the caller may have been led through one or more pathways of the algorithmic dialog before, and therefore knows what information is required without being prompted.

In this example, the caller initially says: "I need to set up an initial rental, for claim number 1 2 3 4 5 6 7 8 9, phone number 5 5 5 5 5 5 5 5 5, branch ID 1 2 3 4 5 6, vehicle is a 2020 Chevrolet Corvette." The bot 140 interprets the caller's lengthy statement using NLP model(s) 142, and in response to detecting an intent to obtain a rental changes to an "Initial Rental" dialog state. In accordance with the algorithmic dialog being executed by the bot 140, the bot 140 confirms the caller's choice ("I can help you make a reservation"), and changes to a "Claim Number" dialog state. In the "Claim Number" state, the bot 140 processes the claim number provided by the caller, requests another system or application to confirm the claim number while providing feedback to the caller ("Let me look that up in our system."), receives the confirmation from the other system or application, and provides a confirmation to the caller ("OK. I found the claim number."). Unlike other scenarios in the "Claim Number" state, however, the bot 140 does not prompt the caller for a claim number.

Having confirmed the claim number, and in accordance with the algorithmic dialog, the bot 140 then changes to a "Branch ID" state. In the "Branch ID" state, the bot 140 processes and accepts the branch ID provided by the caller, and generates a confirmation ("OK. I have the branch ID."). Unlike other scenarios in the "Branch ID" state, the bot 140 does not prompt the caller for a branch ID. Having confirmed the branch ID, and in accordance with the algorithmic dialog, the bot 140 then changes to a "Phone Number" state. In the "Phone Number" state, the bot 140 processes and accepts the phone number provided by the caller, and generates a confirmation ("OK. I have the phone number."). Unlike other scenarios in the "Phone Number" state, the bot 140 does not prompt the caller for a phone number.

Having confirmed the phone number, and in accordance with the algorithmic dialog, the bot 140 then changes back to the "Initial Rental" state, and confirms the provided information and prompts the caller: "I'm ready to make the reservation for claim number 1 2 3 4 5 6 7 8 9, branch ID number 1 2 3 4 5 6, phone number 5 5 5 5 5 5 5 5 5. Are you ready to proceed with this insured's rental reservation?" The caller responds "Yes" (one of at least two expected answers in this dialog state) and the bot 140 responds with a confirmation ("Ok, I'll make the reservation in our system."). The intelligent voice interface 126 triggers another system or application to send the rental authorization to a rental company, and the bot 140 provides a confirmation while further prompting the caller ("I have sent the rental authorization to Rental Company A, branch ID 1 2 3 4 5 6. Is there anything else I can help you with today?").

Whereas the voice communication 520 of FIG. 5B represents a scenario in which the caller provides multiple pieces of information at the outset of the call, the voice communication 540 of FIG. 5C represents a scenario in which the caller provides multiple pieces of information at some later point, after being prompted for some, but not all, of that information.

In this example, the caller initially says: "I need to set up an initial rental." The bot 140 interprets the caller's statement using NLP model(s) 142, and in response to detecting an "initial rental" intent changes to an "Initial Rental" dialog state. In accordance with the algorithmic dialog being executed by the bot 140, the bot 140 confirms the caller's choice ("I can help you make a reservation"), changes to a "Claim Number" dialog state, and prompts the caller for the relevant information ("What is the 9-character claim number?").

In response, the caller provides not only the requested claim number but also other information, stating: "My claim number is 1 2 3 4 5 6 7 8 9, phone number 5 5 5 5 5 5 5 5 5, branch ID 1 2 3 4 5 6." The bot 140 interprets the caller's statement using NLP model(s) 142, and in response to detecting a "claim number" intent the bot 140 processes the claim number, requests another system or application to confirm the claim number while providing feedback to the caller ("Let me look that up in our system."), receives the confirmation from the other system or application, and generates a confirmation ("Ok. I found the claim number."). Unlike other scenarios in the "Claim Number" state, the bot 140 does not prompt the caller for a claim number.

Having confirmed the claim number, and in accordance with the algorithmic dialog, the bot 140 then changes to a "Branch ID" state. In the "Branch ID" state, the bot 140 processes and accepts the branch ID provided by the caller, and generates a confirmation ("Ok. I have the branch ID."). Unlike other scenarios in the "Branch ID" state, the bot 140 does not prompt the caller for a branch ID. Having confirmed the branch ID, and in accordance with the algorithmic dialog, the bot 140 then changes to a "Phone Number" state. In the "Phone Number" state, the bot 140 processes and accepts the phone number provided by the caller, and generates a confirmation ("Ok. I have the phone number."). Unlike other scenarios in the "Phone Number" state, the bot 140 does not prompt the caller for a phone number.

Having confirmed the phone number, and in accordance with the algorithmic dialog, the bot 140 then changes back to the "Initial Rental" state, and confirms the provided information while again prompting the caller: "I'm ready to make the reservation for claim number 1 2 3 4 5 6 7 8 9, branch ID number 1 2 3 4 5 6, phone number 5 5 5 5 5 5 5 5 5. Are you ready to proceed with this insured's rental reservation?" The subsequent portions of the voice communication 540 (not shown in FIG. 5C) may be similar to the voice communication 520 of FIG. 5B.

In the embodiments corresponding to the scenarios of FIGS. 5A-5C, the intelligent voice interface 126 may, when determining that the caller's voice input includes information that is not requested/expected in the current dialog state, identify a dialog state to which that other information pertains, so that the information can be properly interpreted. For example, the intelligent voice interface 126 may select one or more of the NLP model(s) 142 to process the information based upon the dialog state, and determine one or more intents of the caller using the selected model(s). Moreover, the intelligent voice interface 126 may use a first set of one or more processing threads and/or cores to identify and/or process information that is requested/expected in the current dialog state, and a second set of one or more processing threads and/or cores to identify and/or process information that is not requested/expected in the current dialog state, in order to reduce processing/dialog delays.

Figure 6:
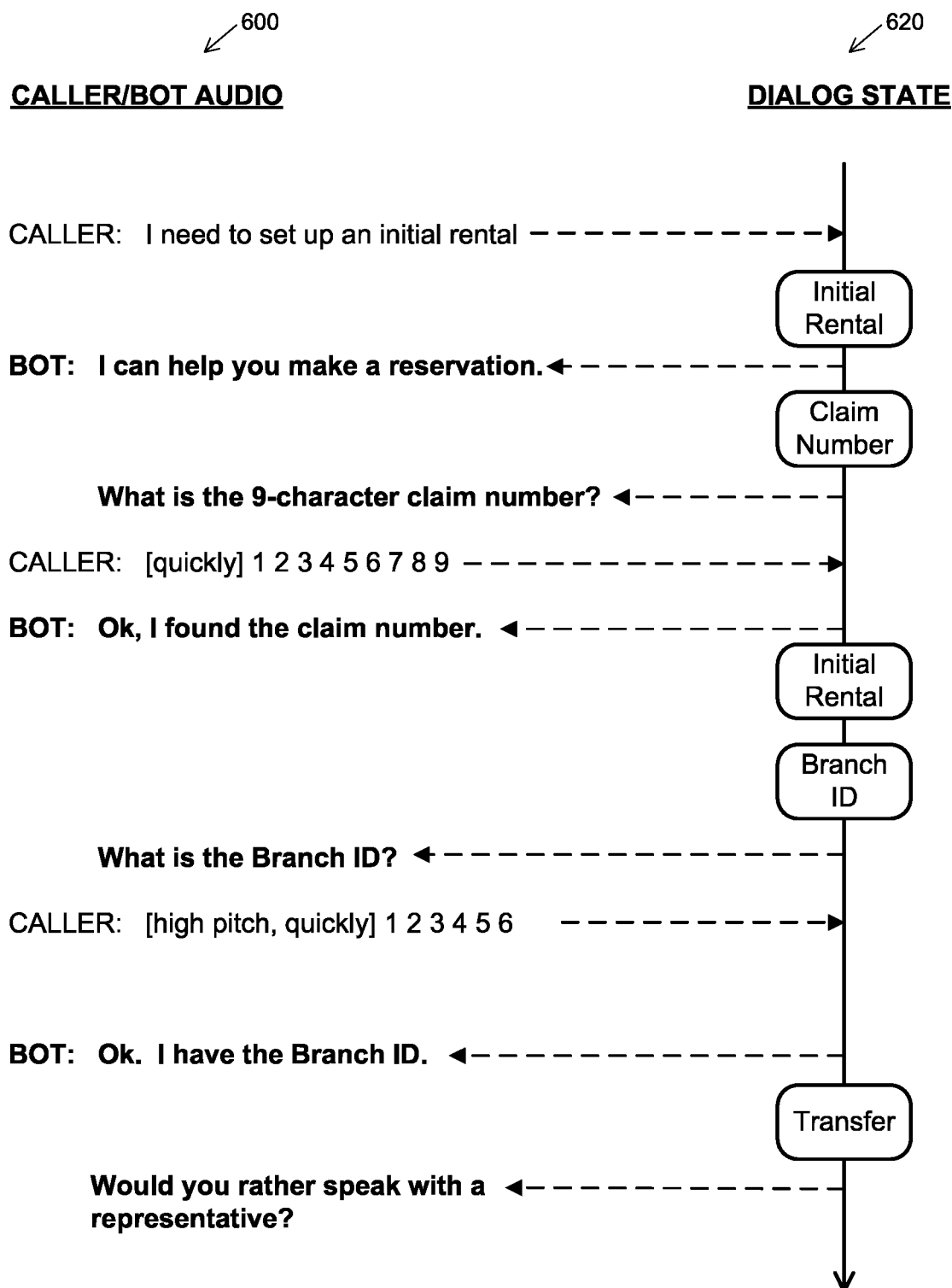
FIG. 6 depicts an exemplary voice communication in which the caller provides non-textual indications of his or her state, and the corresponding state of an algorithmic dialog managed by the intelligent voice interface disclosed herein.

FIG. 6 depicts an exemplary voice communication 600 in which the caller provides non-textual indications of his or her state (e.g., emotional or mental state), and the corresponding state 620 of an algorithmic dialog managed by an intelligent voice interface such as the intelligent voice interface 126. For ease of explanation, FIG. 6 will be described below with specific reference to the intelligent voice interface 126 and other components of the system 100. As in FIGS. 5A-5C, the dialog state 620 at the top of the descending vertical timeline is an initial state (e.g., "New Caller," etc.) not shown in the diagram.

In this example, the caller initially says: "I need to set up an initial rental." The bot 140 interprets the caller's statement using NLP model(s) 142, and in response to detecting an intent to initiate/obtain a rental changes to an "Initial Rental" dialog state. In accordance with the algorithmic dialog being executed by the bot 140, the bot 140 confirms the caller's choice ("I can help you make a reservation"), changes to a "Claim Number" dialog state, and prompts the caller for the relevant information ("What is the 9-character claim number?").

In response, the caller provides the requested claim number ("1 2 3 4 5 6 7 8 9"), while speaking more quickly. The bot 140 interprets the caller's statement using NLP model(s) 142, and in response the bot 140 processes the claim number, requests another system or application to confirm the claim number while providing feedback to the caller ("Let me look that up in our system."), receives the confirmation from the other system or application, and generates a confirmation ("Ok. I found the claim number."). In this embodiment/scenario, however, the bot 140 also detects the increased speed at which the caller is speaking (e.g., relative to the speed at which the caller made his or her earlier statement(s)), and stores an indication of the event in memory (e.g., in the memory 124).

Having confirmed the claim number, and in accordance with the algorithmic dialog, the bot 140 cycles back through the "Initial Rental" state and then changes to a "Branch ID" state. In the "Branch ID" state, the bot 140 prompts the caller for the relevant information ("What is the Branch ID?"). In response, the caller provides the requested branch ID number ("1 2 3 4 5 6"), again while speaking quickly but now also at a higher pitch. The bot 140 interprets the caller's statement using NLP model(s) 142, and in response the bot 140 processes the branch ID provided by the caller and generates a confirmation ("Ok. I have the branch ID."). The bot 140 also detects both the increased speed at which the caller is speaking (e.g., relative to the speed at which the caller made his or her initial statement(s)) and the higher pitch/frequency (or possibly variations or patterns in pitch/frequency, etc.), and stores an indication of these events in memory (e.g., in the memory 124).

While in other scenarios (i.e., without changes in rapidity and pitch of the caller's voice) the bot 140 might then follow a pathway of the algorithmic dialog that requests other information (e.g., phone number), in this embodiment/scenario the bot 140 determines, based on the combination of the two events, that the user is agitated (e.g., frustrated or angry). In response, the bot 140 changes to a "Transfer" dialog state, and in accordance with that state asks the caller whether he or she would like to speak with a representative. If the caller indicates that he or she would like to speak with a representative, the bot 140 causes the caller to be transferred to a human representative, and terminates the call from the perspective of the bot 140. Otherwise, the bot 140 may continue along the earlier pathway of the algorithmic dialog (e.g., with additional prompts to the caller).

The precise algorithm or model used by the bot 140 to determine that the user is in a particular state can vary depending on the embodiment. For example, each detected "event" relating to caller state may add a predetermined number of points to a "caller state score" (e.g., adding one point for each instance of rapid speaking, and adding two points for each instance of one or more criteria relating to pitch changes being satisfied), and the bot 140 may determine that the user is in a particular state (e.g., agitated) when that score meets a predetermined threshold (e.g., three points). As another example, the bot 140 may select a different path through the algorithmic dialog based upon the detection of only one such event.

In some embodiments, the bot 140 may be configured to detect other non-textual characteristics to determine the caller's state, and/or other types of caller states, in addition to (or instead of) those noted above. For example, the bot 140 may be configured to determine when the caller is happy or satisfied (e.g., based on loudness and/or intonations/variations in pitch, etc.), and select the pathway through the algorithmic dialog accordingly (e.g., by directing the caller to a questionnaire that is more likely to be answered by caller's in a good mood).

In some embodiments, the bot 140 may, in at least some scenarios, use textual content of the caller's speech to determine the caller's state, in addition to the non-textual characteristic(s). For example, the bot 140 may determine that the caller's utterance "come on" or "give me a break," along with a change in the caller's pitch and/or loudness, is indicative of the caller being frustrated or angry, and in response select a corresponding pathway through the algorithmic dialog.

While the above has been described with respect to determinations made by the bot 140, in other embodiments (e.g., embodiments that use a conventional voicebot), a component of the IVI system 102 other than the bot 140 is configured to detect the caller's state. For example, the middleware 138 may detect the non-textual indicia of the user's state, determine whether the indicia satisfy one or more criteria for a particular caller state, and cause the bot 140 to change the pathway through the algorithmic dialog when the one or more criteria are satisfied (e.g., by sending data to the bot 140 via an API).

Exemplary Fuzzy Matching Technique

When speaking conversationally, a caller may imprecisely identify an entity in response to a bot request. For example, a caller may identify a 2004 Chevrolet Silverado 1500 as "a '04 [oh-four] Chevy," identify the address 1212 Popple Lane as "1212 Popple Street," identify William Alpine Smith as "Bill Smith," and so on. Moreover, the entity types or names may be imperfectly recorded in a database that is accessed during a caller conversation. For example, the database might record the make of a 2004 Chevrolet Silverado 1500 as "Silverado with automatic transmission." Thus, it is not uncommon for conventional bots to fail to match caller-identified entities to the corresponding entities in records/databases.

FIG. 7 depicts an exemplary fuzzy matching process flow 700 that may be implemented by an intelligent voice interface, such as the intelligent voice interface 126 of FIG. 1, to mitigate this problem. For ease of explanation, the process flow 700 will be described below with specific reference to the intelligent voice interface 126 and other components of the system 100.

Prior to the process flow 700, the STT unit 132 converts the caller's speech to text/words. As the term is used herein, a "word" may be any kind of word that can be spoken, including a name, a classification, a number (e.g., "two hundred and three"), and so on. The intelligent voice interface 126 (e.g., the bot 140 or middleware 138) parses the text/words into three word segments each having one or more words (Word Segment 1, Word Segment 2, Word Segment 3), e.g., based on the intents determined by the NLP model(s) 142. In one scenario, for example, Word Segment 1 is a vehicle year, Word Segment 2 is the vehicle make, and Word Segment 3 is the vehicle model. In another example scenario, Word Segment 1 is a person's first name, Word Segment 2 is the person's middle name, and Word Segment 3 is the person's last name. In yet another example scenario, Word Segment 1 is a street number of an address, Word Segment 2 is the street name, and Word Segment 3 is an appendix to the street name (e.g., "Street" or "Lane" or "Circle"). While FIG. 7 shows three word segments, it is understood that other embodiments and/or scenarios may have only two word segments, or more than three word segments. For example, with two word segments, Word Segment 1 may be a person's first name and Word Segment 2 may be the person's last name.

In the example process flow 700, the intelligent voice interface 126 determines a level of string matching for each word segment, by comparing the word segment to the corresponding word segment in a database (e.g., in another computing system, in records of the entity that also maintains the IVI system 102). The intelligent voice interface 126 may make this comparison by querying a remote computing system that can directly access the database and return the results to the IVI system 102, for example. In the example embodiment of FIG. 7, the intelligent voice interface 126 classifies each word segment according to one of four discrete levels of string matching shown in FIG. 7: exact match, partial match, absent, or total mismatch.

For example, the intelligent voice interface 126 may determine there is an "exact match" if the NLP model(s) 142 identified a corresponding intent in the caller's dialog and all characters match, determine there is a "partial match" if the NLP model(s) 142 identified a corresponding intent in the caller's dialog and at least a threshold number and/or percentage of characters match, determine the word segment is "absent" if the NLP model(s) 142 did not identify any corresponding intent in the caller's dialog, and determine there is a "total mismatch" if the NLP model(s) 142 identified a corresponding intent in the caller's dialog but there is neither an exact match nor a partial match. In other embodiments, there may be more or fewer than four levels of string matching, and/or different criteria may be used for the "partial match," etc. Moreover, in some embodiments, the intelligent voice interface 126 calculates a more continuous level of string matching for each word segment (e.g., a percentage match or other match score).

After the intelligent voice interface 126 determines the level of string matching for each word segment, the intelligent voice interface 126 may use the determined levels of word segment string matching to determine a level of overall "match certainty." For example, the intelligent voice interface 126 may determine that the determined levels of string matching collectively correspond to one of N levels of match certainty (e.g., for N=3, "good match certainty," "fair match certainty," or "poor match certainty," or, for N=100, a level of match certainty between 1 and 100, etc.). As a more specific example, the intelligent voice interface 126 may determine that there is "good match certainty" if one or both of: (1) all three word segments have at least a "partial match" and at least one word segment has an "exact match"; or (2) at least two of the three word segments have an "exact match." Continuing with this example, the intelligent voice interface 126 may determine: (1) that there is "partial match certainty" if the "good match certainty" requirements are not met, and if at least two word segments have at least a "partial match"; and (2) that there is "poor match certainty" if both the "good match certainty" and "partial match certainty" requirements are not met.

Based upon the determined level of match certainty, the intelligent voice interface 126 (e.g., the bot 140) selects a pathway of the algorithmic dialog for the caller, in real-time during the call. For example, the intelligent voice interface 126 may confirm/acknowledge that the information was received and/or proceed to another dialog stage if there was "good match certainty" (or a match certainty between 95 and 100%, etc.), repeat the information (e.g., the version of the information stored in the database/records) and ask for caller confirmation if there was "partial match certainty" (or match certainty between 50 and 94%, etc.), or simply re-prompt the caller for the information if there was "poor match certainty" (or match certainty between 0 and 49%, etc.). In some embodiments, the criteria for each level of match certainty also depends on other factors, such as the dialog state (e.g., which type of information is being requested). For example, the criteria for determining "good match certainty" for a claim number or a person's name may be more strict than the criteria for determining "good match certainty" for a phone number.

Figure 8:
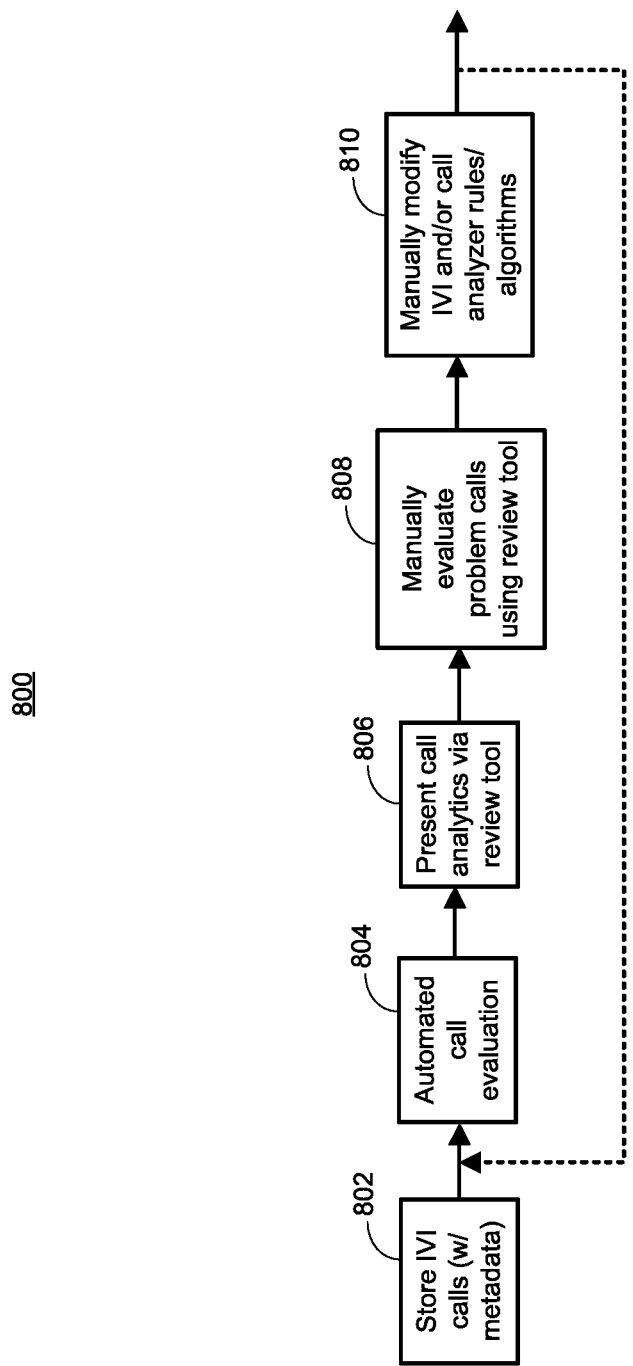
FIG. 8 depicts an exemplary design process flow for improving the performance of an intelligent voice interface using a review tool and manually modifying intelligent voice interface rules or algorithms.
Figure 9:
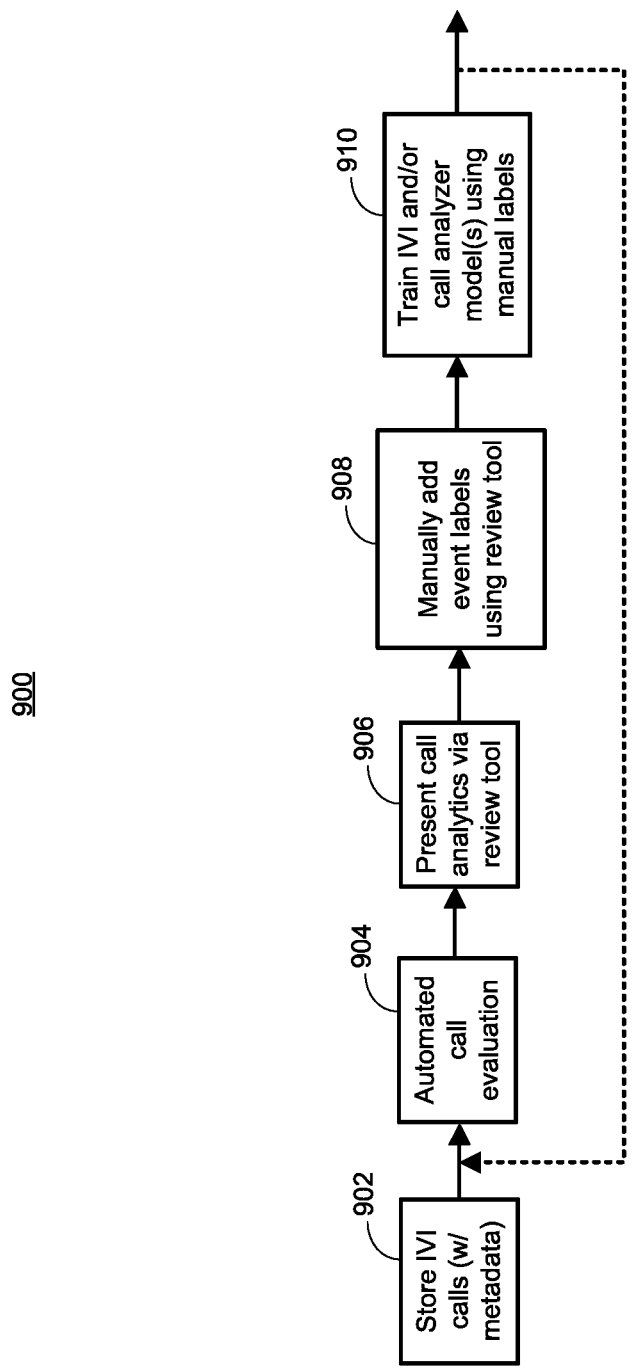
FIG. 9 depicts an exemplary design process flow for improving the performance of an intelligent voice interface by using a call review tool to manually generate labels for training one or more intelligent voice interface models.

Exemplary Processes for Improving Intelligent Voice Interface Performance Using a Call Review Tool To effectively improve/refine the performance of an intelligent voice interface, it is necessary to have some understanding of how the intelligent voice interface is currently performing. To this end, in some embodiments, the IVI system 102 (or another computing device or system) may provide a call review tool for users. FIGS. 8 and 9 depict exemplary design process flows for improving the performance of an intelligent voice interface using such a review tool. For ease of explanation, the process flows of FIGS. 8 and 9 will be described below with specific reference to the intelligent voice interface 126, the call review tool 130, and other components of the system 100.

Referring first to FIG. 8, in stage 802 of a design process flow 800, data associated with calls between the intelligent voice interface 126 and various callers is stored in the call database 150 over time. For example, the call data for each call may include the raw voice data for the full communication/dialog (e.g., an audio file such as a WAV file), a text transcript of the full dialog (e.g., as generated by the STT unit 132), and various types of call metadata. Call metadata may include, for example, timing information (e.g., call duration, start and end times, etc.), indications of technical events (e.g., error events, socket open/close events, etc.), and/or other information related to events associated with a call. The event information may include information generated by the audio handler 136 (e.g., time-stamped indications that the audio handler 136 detected another person's voice or a side conversation), the middleware 138 (e.g., time-stamped indications that the middleware 138 held or forwarded a response from the bot 140), the bot 140 and/or NLP model(s) 142 (e.g., time-stamped indications of detected caller intents and/or user emotional states), and so on.

At stage 804, the call analyzer 128 evaluates the calls. Stage 804 may occur in real-time as each call is occurring and/or as a post-call batch process for one or more full calls at a time. To perform this analysis, the call analyzer 128 may apply heuristic rules/algorithms and/or one or more machine learning models (not shown in FIG. 1) to tag or label a given call, or a given call portion (e.g., a specific time or time range, or a specific turn of the conversation, etc.), as being associated with a particular event or set of events. For example, the call analyzer 128 may include, or otherwise make use of, a deep learning neural network that was trained with a supervised learning technique (i.e., using historic call data and manual labels), in order to determine/infer whether the bot 140 (or more generally the intelligent voice interface 126) was unable to understand the caller specifically due to a dialect or accent of the caller, whether the caller was unprepared for the call (e.g., did not have relevant information handy), whether the call was subject to excessive background noise, whether the caller was having a side conversation, and/or other types of call-related information.

The call analyzer 128 may also generate one or more overall ratings (e.g., scores and/or classifications) for each call, based on any suitable information associated with the call. For example, the rating(s) may be based upon call metadata already stored in the call database 150 (e.g., an intent, generated by one of the NLP model(s) 142, that indicates the customer expressed satisfaction at the end of the call), and/or may be based upon other call metadata generated by the call analyzer 128 (e.g., whether a trained machine learning model of the call analyzer 128 classifies the call as "successful," whether the call analyzer 128 determines the bot 140 performed well, whether the call analyzer 128 determines the bot 140 properly recognized a claim number provided by the caller, etc.). Generally, the call analyzer 128 can automatically apply multiple classifications to enable different analyses of different aspects of a given call.

In some embodiments, the call analyzer 128 generates a classification label for each and every call with respect to certain categories (e.g., how well the bot 140 performed, a business result of the call, etc.), but only optionally labels a given call in other respects depending on the situation. The IVI system 102 may store the event tags/labels identified by the call analyzer 128, including any rating(s) generated by the call analyzer 128, as additional call metadata in the call database 150.

At stage 806, the client device 104 (or, in some embodiments, the WI system 102) presents the call analytics stored in the call database 150, or a portion thereof, to a user via the call review tool 130. In the embodiment of FIG. 1, this entails the user of the reviewer device 106 accessing a website hosted by the IVI system 102 via the web browser application 192. As noted above, however, the call analyzer 128 and/or call review tool 130 may instead reside at the reviewer device 106, with the reviewer device 106 accessing the call database 150 to provide the information needed by the call analyzer 128 and/or call review tool 130.

At stage 808, the user of the reviewer device 106 manually evaluates "problem calls" (and possibly also calls that went well) using the call review tool 130, via a user interface presented to the user via the web browser application 192 and the user output device 184. The user may also interact with the user interface via the user input device 186 (e.g., to change screens of the user interface, or to adjust settings to filter displayed information, etc.). In some embodiments and scenarios, the user initially identifies "problem calls" at stage 808 based upon a displayed indication of the call ratings generated by the call analyzer 128.

For a particular call being reviewed, stage 808 may include the user listening to the raw audio of the call, reading the text transcript of the call, and reviewing various event labels of the call (e.g., event labels generated by any component of the intelligent voice interface 126 and/or the call analyzer 128). At stage 810, based upon the user's understanding of the information presented via the call review tool 130, the user (and/or other team members) may manually modify the rules/algorithms employed by the intelligent voice interface 126 and/or call analyzer 128, and possibly tweak model parameters (e.g., of the NLP model(s) 142 or models employed by the call analyzer 128), to improve future performance. As indicated by the dashed line in FIG. 8, the process may be repeated iteratively, by applying the now-modified call analyzer 128 to the same call information (and/or applying the now-modified intelligent voice interface 126 to the same caller audio, etc.), and observing the results via the call review tool 130.

Whereas the design process flow 800 of FIG. 8 involves the user and/or other team members manually/directly adjusting rules, algorithms, and/or models, FIG. 9 depicts a design process flow 900 in which the user uses the call review tool 130 to manually generate additional event tags/labels, which can serve as labels for supervised training of machine learning models used by the intelligent voice interface 126 and/or call analyzer 128.

Stages 902 through 906 of the process flow 900 may be similar to stages 802 through 806, respectively, of the process flow 800. At stage 908, however, the user manually adds event labels to the call or call portions (i.e., labels corresponding to call-related events as ascertained by the user during his or her review) via the user interface provided by the call review tool 130, and via the user input device 186. At stage 910, the IVI system 102 (or another computing system) trains one or more machine learning models of the intelligent voice interface 126 and/or call analyzer 128 using the manually-added labels.

As one specific example, the user may note from the call audio that the caller has a heavy accent, and also note that the bot 140 was unable to understand the (otherwise proper/expected) information provided by the caller. In response, the user may add (e.g., for each turn of the dialog in which this occurs) a label indicating that the bot 140 (or more generally, the intelligent voice interface 126) was not able to understand the caller due to the caller's accent. A particular model of the call analyzer 128 may then be trained, or further trained, using the relevant call information (e.g., the audio file portion(s) and output(s) of the NLP model(s) 142) with the manually-generated label, and with similar data/labels from other calls.

As another example, the reviewing user may note from the call audio that the caller is getting upset during a particular portion/turn of the conversation, and add a label (associated with that particular portion/turn) indicating that the caller was upset. A particular model of the bot 140 or middleware 138 may then be trained (or further trained) using the portion of the audio file that corresponds to that turn of the conversation, with the manually-generated label, and with similar data/labels from other calls.

Exemplary Call Review Tool User Interface Screens

FIGS. 10A-10D depict exemplary screens of a user interface that may be generated by a call review tool, such as the call review tool 130, in a use case where the intelligent voice interface 126 handles customer calls for setting up rental car reservations from one of at least two companies ("Company A" and "Company B").

Figure 10A:
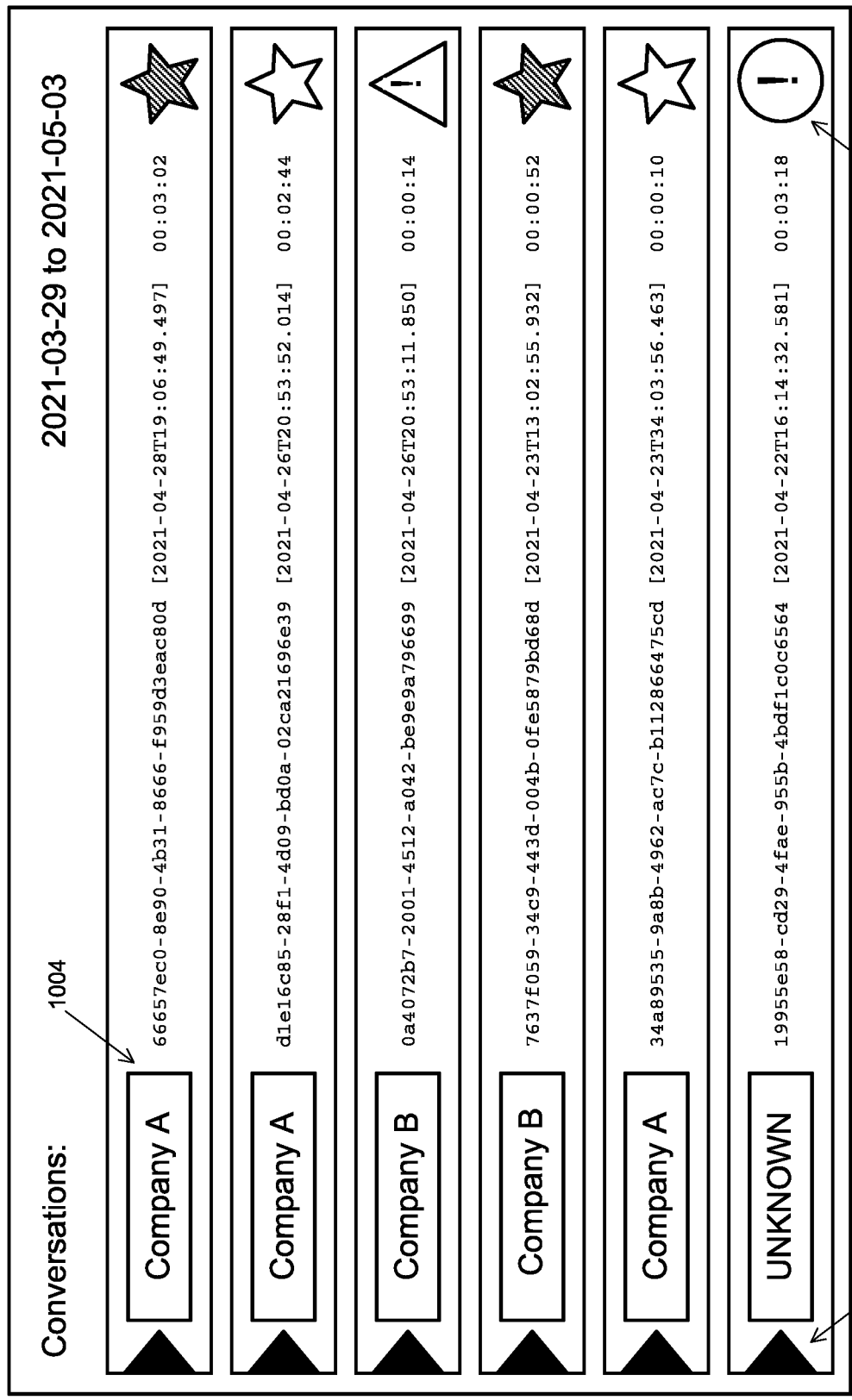

Referring first to FIG. 10A, a screen 1000 of the user interface provides a high-level snapshot of each of a number of calls (labeled "Conversations" in FIG. 10A). The calls shown in the screen 1000 may be calls that met some earlier-applied user filter settings (e.g., calls from a particular date range) or default criteria, for example. The example screen 1000 includes a line item for each of six calls, with a selectable control 1002 for each call/item enabling the user to drill down into further information about the call. An indicator 1004 for each call shows the business outcome of each call, i.e., whether the selected rental company was Company A, Company B, or unknown (e.g., no company was identified, or clearly identified, during the call).

Another indicator 1006 for each call/item shows the rating for the call, e.g., as generated by the call analyzer 128. In the example of FIG. 10A, the shaded star may indicate both that one or more business objectives were satisfied (e.g., selection of a rental company) and that the intelligent voice interface 126 performed in a satisfactory way, the unshaded star may indicate that the intelligent voice interface 126 performed in a satisfactory way but the business objective(s) were not satisfied, the triangle with exclamation point may indicate that the intelligent voice interface 126 performed fairly well but less than ideally, and the circle with exclamation point may indicate that the intelligent voice interface had major performance problems. As noted above, for example, the call analyzer 128 may determine each rating based upon call metadata stored in the call database 150 (e.g., one or more intents generated by the NLP model(s) 142 that indicate whether the customer expressed satisfaction at the end of the call), and/or based upon call metadata generated by the call analyzer 128 itself. In some embodiments, the call analyzer 128 at least partially bases the ratings on the inferred state of the user (e.g., when the bot 140 or middleware 138 uses techniques such as those discussed above in connection with FIG. 6). The indicators 1006 may also, or instead, be coded in other ways, such as with color coding. Moreover, the indicators 1006 may also, or instead, reflect ratings based on other criteria or contexts, such as the estimated amount of time saved in the call (e.g., relative to time required when handled by a human representative, or relative to some baseline past performance, etc.).

As seen in FIG. 10A, the screen 1000 may also include other information, such as a hash or other identifier for each call, a date and time when each call began, and a duration of each call.

Figure 10B:
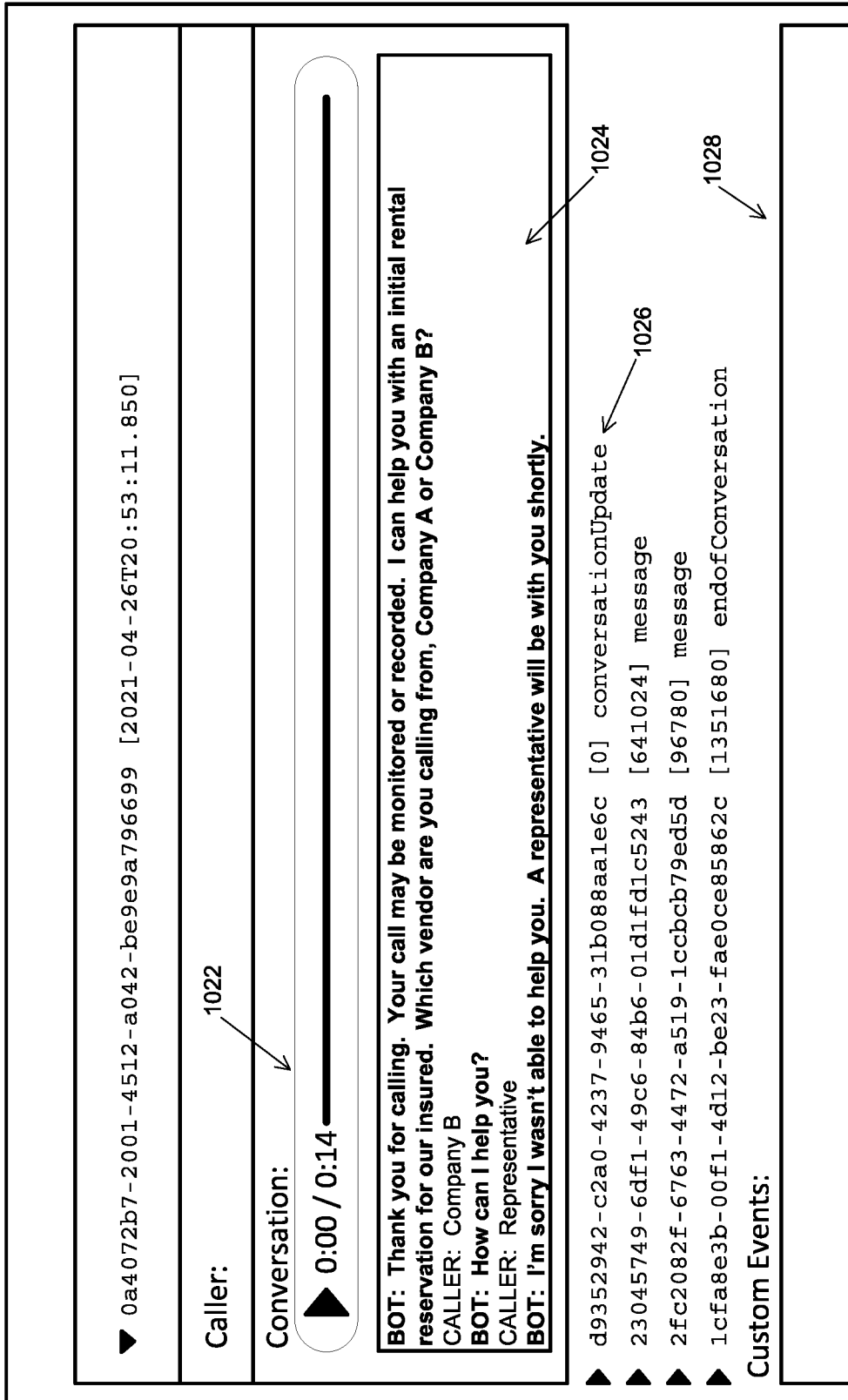

When the user selects one of the controls 1002, the user interface may provide an expanded display of information for the corresponding call, such as the expanded display in screen 1020 of FIG. 10B. The screen 1020 may show the caller's name (if known), and provide a control 1022 that, if selected/activated by the user, causes the audio of the full call (e.g., a corresponding WAV file in the call database 150) to be played via the user output device 184. Also in the example screen 1020, a field 1024 shows the text of the full call. The text may be the output of the STT unit 132 (for the caller statements) and an output of the bot 140 (for the bot statements), for example. Indicators 1026 of various turns of the conversation may be displayed as well, with corresponding controls that, if selected/activated by the user, provide more detailed turn views.

The reviewing user can also manually add event labels to the selected call, in a field 1028. For example, the user may enter labels (e.g., codes) to signify any event that the user believes to be associated with the call based upon his or her review (e.g., an indication that the caller was unprepared for the call, that the bot 140 did not understand the caller's accent, that the call had significant background noise that interfered with the progress of the call, that the call had significant background conversations that interfered with the progress of the call, etc.). As noted above, these manually-added event labels may serve as training labels for a machine learning model of the call analyzer 128. In other embodiments, the manually-added event are added to the call database 150 for other purposes, such as helping future reviewers better understand what happened during the call.

If a user selects/activates one of the controls associated with indicators 1026, the user interface may provide an expanded display of information for the corresponding turn, such as the display in screen 1040 of FIG. 10C. The screen 1040 shows the text for that particular turn (as output by the STT unit 132 or bot 140), provides access to the corresponding audio, and/or shows other information relating to that turn (e.g., in this example, outputs of a Microsoft Azure language understanding (LUIS) model).

If the user selects/activates a control 1042 in the screen 1040, the user interface may provide an expanded display of information for the corresponding call, such as the display in screen 1060 of FIG. 10D. The screen 1060 shows more detailed information associated with the speech-to-text results (e.g., various outputs of the STT unit 132).

Exemplary Event Labels

As discussed above, any given call may be associated with various types of "events." Indications of these events ("event labels") may be provided to a reviewer by the call review tool 130, and/or may be analyzed automatically (e.g., by the call analyzer 128) for call evaluation purposes, etc. The event labels may be automatically generated by the call analyzer 128, for example, and/or may be manually added by a user, etc.

Provided below in Table 1 is a list of exemplary event labels that may be defined within the IVI system 102 (and their corresponding descriptions), specifically in the context of an intelligent voice interface that handles calls relating to vehicle rentals associated with insurance claims. The event labels of this example are grouped into "call sequence" events, "technical" events, and "post-call analysis" categories. In some embodiments, the "post-call analysis" event labels are generated automatically by the call analyzer 128, while the "call sequence" and "technical" event labels are generated by other components of the IVI system 102 and/or related systems.

TABLE 1

| Call Sequence Event Labels | |
|---|---|
| AUDIO_STREAM_ENDED | End of audio stream detected |
| BOT_FINISHED_CALL | Caller stated he/she had no other tasks to complete and is done with call |
| BOT_NOT_RESPONDING | Vendor phone subsystem indicated it has not received a response |
| BOT_TRANSFER_MAX_FAILED_ATTEMPTS | Caller failed to provide requested information too many times and was transferred |
| CALL_FLOW_REQ_TRANSFER | Vendor phone subsystem transferred caller |
| CLAIM_FOUND_CLOSED | Successfully found claim number provided by caller, and claim status was closed |
| CLAIM_FOUND_OPEN | Successfully found claim number provided by caller, and claim status was open |

TABLE 1-continued

| | |
|---|---|
| CLAIM_NOT_FOUND | Unable to find claim number provided by caller |
| CLAIM_NOT_RENTAL_ELIGIBLE | Successfully found claim number provided by caller, but not eligible for rental due to business rule |
| CUST_REQ_TRANSFER | Caller (customer) requested transfer to a call representative |
| ELICIT_DATA_FAILURE | An alphanumeric value provided by caller did not meet validity criteria (accompanied by data indicating what value was being requested) |
| NEW_CALL | New call received |
| RENTAL_CREATE_SUCCESS | Rental was successfully created for caller |
| TSD_GATEWAY_TIMEOUT | Unable to communicate with business partner API (connection unavailable) |
| UNKNOWN_INTENT | Bot unable to discern what caller wanted to do based upon the caller's utterance |
| CLAIM_NUM_DIGIT_REPLACED | Custom rules were applied to modify the information received from the STT and/or NLP models |
| ELICITED_DATA_CONFIRMED | Caller confirmed that all collected data is correct and he/she wishes to proceed |
| DELAYED_RESPONSE_SENT | Bot message delayed/held by middleware is forwarded to caller due to timeout |
| REPROMPT_DELAYED_RESPONSE_SENT | During confirmation, caller was re-prompted to proceed with reservation to confirm correctness |
| Technical Event Labels | |
| AUDIOHANDLER_CONNECTION_ESTABLISHED | Lambda having call audio stream information successfully communicated with audio handler |
| AUDIOHANDLER_CONNECTION_ERROR | Lambda having call audio stream information received error when communicating with audio handler |
| AUDIOHANDLER_CONNECTION_CLOSED | Lambda having call audio stream information finished communicating with audio handler |
| REDIS_CONNECTION_NEW | New Redis client established |
| REDIS_CONNECTION_ERROR | Error connecting to Redis |
| REDIS_UNAVAILABLE | Error connecting to Redis; retry time exceeded |
| CHECKING_FOR_CALL_ENDED | When bot has not responded to vendor phone subsystem, causing timeout to trigger BOT_NOT_RESPONDING business event |
| CALL_STILL_ACTIVE | Vendor phone subsystem has no indication that call has ended; timeout for BOT_NOT_RESPONDING will trigger soon if no response from caller |
| CALL_END_DETECTED | Vendor phone subsystem validated that call has ended, and vendor phone subsystem acts accordingly |
| AUDIO_STREAM_ENDED | End of audio stream detected |
| PARTIAL | Attempt to join partial alphanumeric values into a complete value |
| UTTERANCE_ACCEPTED | Current dialog evaluated the caller's utterance and metadata (e.g., confidence, intent, and loudness classification) and determined the utterance was acceptable to be processed |
| UTTERANCE_REJECTED | Current dialog evaluated the caller's utterance and metadata (e.g., confidence, intent, and loudness classification) and determined the utterance was not acceptable to be processed |
| CLAIM_API_UNAVAILABLE | API call to claims system failed |

TABLE 1-continued

Post-Call Analysis Event Labels

| | |
|---|---|
| CALL_SUMMARY | Summary of relevant data aggregated into one event (e.g., including call duration) |
| CALL_ABORTED | Caller attempted to use bot but quit before successful completion and did not transfer to call representative |
| CALLER_QUICK_HANGUP | Caller hung up without interacting with bot |
| CALLER_QUICK_TRANSFER | Caller requested call representative without interaction with bot |
| VOICEBOT_CLASSIFICATION | Classification of bot as "good," "small issues," or "big issues" to help prioritize which calls should be manually reviewed by bot support team(s) |
| CALL_OUTCOME | Generalization of what the outcome of the call was (e.g., "rental not eligible," "rental success," "caller not prepared," etc.) |
| CLAIM_NUMBER_SIMPLE_CLASSIFICATION | Simpler metric to evaluate how accurately the bot obtained a claim number (alpha numeric value) from a caller (e.g., "correct" or "incorrect") |
| CLAIM_NUMBER_DETAILED_CLASSIFICATION | More detailed metric to evaluate how accurately the bot obtained a claim number (alpha numeric value) from a caller (e.g., "confirmed correct," "multiple attempt, confirmed correct," "single attempt, confirmed incorrect," etc.) |
| BUSINESS_CLASSIFICATION | Classification of how successful the use case was, independent of how bot performed (e.g., "good," "small issues," or "big issues" to help prioritize which calls should be manually reviewed by business case support team(s) |

In other embodiments, the IVI system 102 may define more, fewer, and/or alternate events and/or event labels than those shown in Table 1. Moreover, certain events/labels may represent aggregations of two or more other events/labels. For example, the CALL_SUMMARY and/or CALL_CLASSIFICATION event labels listed above may be labels of aggregate events, and may be used to derive the call ratings discussed above and/or shown in FIG. 10A.

Exemplary System for Facilitating User Interactions with a Social Network Platform Using an Intelligent Voice Interface For some users, voicebots (and more specifically, personal voice assistants) have become portals or interfaces to access their social networks, with particular benefit for users who may feel less comfortable using a smartphone or desktop/laptop computer. For example, the Sundial social network platform allows a user (e.g., an elderly person) to connect to a "Care Circle" (one or more people who can assist with that user's long-term care, e.g., by making sure his/her medications are being taken, etc.) via the user's personal voice assistant, which is configured with the appropriate application/software (e.g., a Sundial "skill" for Alexa). The user may simply tell his/her personal voice assistant device (e.g., Amazon Echo) what he/she wants to convey to the Care Circle, without having to prepare an email or open a web browser, for example.

Unfortunately, user interactions with currently-available, personal voice assistants (e.g., Amazon's Alexa, Apple's Ski, Google Nest, etc.) may be greatly limited for various reasons. For example, these personal voice assistants have some of the same shortcomings with respect to "conversational" dialog discussed above in connection with conventional voicebots. Moreover, some personal voice assistants can only process user statements having a relatively short duration (e.g., eight seconds for Alexa), making it difficult for users in some scenarios (e.g., if a Sundial user wishes to use the personal voice assistant to provide his/her Care Circle a lengthy grocery list of items to pick up, or a detailed schedule of upcoming doctor appointments, etc.).

To address this problem, an intelligent voice interface (e.g., similar to the intelligent voice interface 126) is configured to facilitate user interactions with the social network platform providing the user's social network (e.g., Sundial, Facebook, Twitter, LinkedIn, etc.). In some embodiments, the intelligent voice interface effectively translates voice communications from a user into a format (e.g., terminology, maximum message duration, etc.) that can be better understood by a personal voice assistant, such as Alexa or Siri, which can then communicate with the user's social network in accordance with the user's desires.

Figure 11:
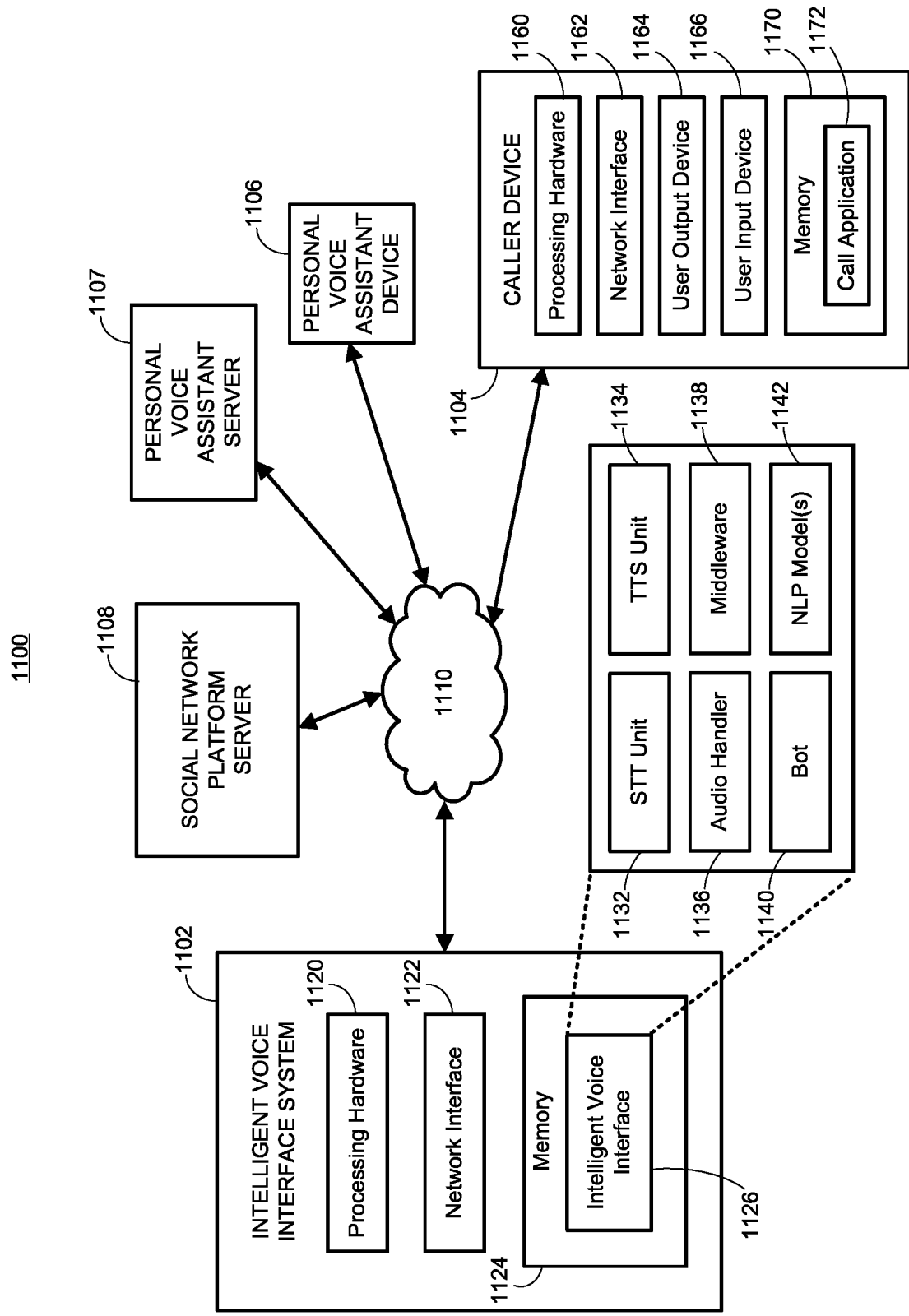
FIG. 11 is a simplified block diagram of an exemplary computer system for facilitating user interactions with a social network platform.

FIG. 11 is a simplified block diagram of an exemplary computer system 1100 for facilitating user interactions with a social network in such a manner. As seen in FIG. 11, the system 1100 may include an IVI system 1102, a caller device 1104, a personal voice assistant device 1106, a personal voice assistant server 1107, and a social network platform server 1108, some or all of which are communicatively coupled via a network 1110. The network 1110 may be similar to the network 110 of FIG. 1, for example.

The IVI system 1102 may be similar to IVI system 102 of FIG. 1 (e.g., with components 1120, 1122, 1124, 1126, 1132,

1134, 1136, 1138, 1140, and 1142 being similar to components 120, 122, 124, 126, 132, 134, 136, 138, 140, and 142, respectively), and the caller device 1104 may be similar to caller device 104 of FIG. 1 (e.g., with components 1160, 1162, 1164, 1166, 1170, and 1172 being similar to components 160, 162, 164, 166, 170, and 172, respectively).

A user of both the caller device 1104 and the personal voice assistant device 1106 has a social network on a particular social network platform (e.g., Sundial, Facebook, LinkedIn, Twitter, etc.), with one or more entities being connected to the user via the social network (e.g., Care Circle members in Sundial, friends on Facebook, connections on LinkedIn, etc.). The personal voice assistant device 1106 may be configured/programmed to interface with the social network platform in a manner that enables the user to perform one or more actions on the social network via the personal voice assistant device 1106, such as posting group messages or delivering personal messages to individuals. Moreover, the caller device 1104 may be configured to enable the user to initiate and conduct a voice call with the intelligent voice interface 1126.

The personal voice assistant device 1106 may be any computing device that provides, or provides access to, a voicebot. For example, the personal voice assistant device 1106 may be an Amazon Echo device that provides user access to Alexa, or a Google Nest device, etc. In some embodiments, the caller device 1104 and the personal voice assistant device 1106 are the same device. For example, the caller device 1104 may be a smartphone that enables the user to initiate a voice conversation with the intelligent voice interface 1126, and also supports a personal voice assistant such as Apple's Ski.

In some embodiments, the personal voice assistant server 1107 provides the artificial intelligence of the personal voice assistant device 1106. If the personal voice assistant device 1106 is an Amazon Echo device, for example, the personal voice assistant server 1107 may provide the Amazon Lex service (e.g., the underlying machine learning models used to understand the user's speech) to the personal voice assistant device 1106. The personal voice assistant server 1107 may be a single computing device, or a collection of local or distributed computing devices.

In some embodiments, the user does not have (and the system 1100 does not include) the personal voice assistant device 1106. For example, the personal voice assistant server 1107 may receive user messages by other means (e.g., directly from the IVI system 1102 as discussed in various examples below). The term "personal voice assistant" as used herein refers to the voicebot service, e.g., whether provided by the personal voice assistant device 1106, the personal voice assistant server 1107, or some combination of the device 1106 and server 1107.

The social network platform server 1108 generally supports the functionality of the social network platform that enables the user to interact with his or her social network. For example, the social network platform server 1108 may provide functionality for posting/circulating messages to the user's social network, changing a posted status of the user (e.g., "at home" or "took medication today"), receiving messages and/or notifications from other users, adding social network connections, removing social network connections, and so on. While not shown in FIG. 11, the user may also be able to access his or her social network via a web browser application (e.g., similar to application 192), stored in the memory 1170, that enables the user to access a website hosted by the social network platform server 1108. The social network platform server 1108 may be a single computing device, or a collection of local or distributed computing devices.

Figure 12:
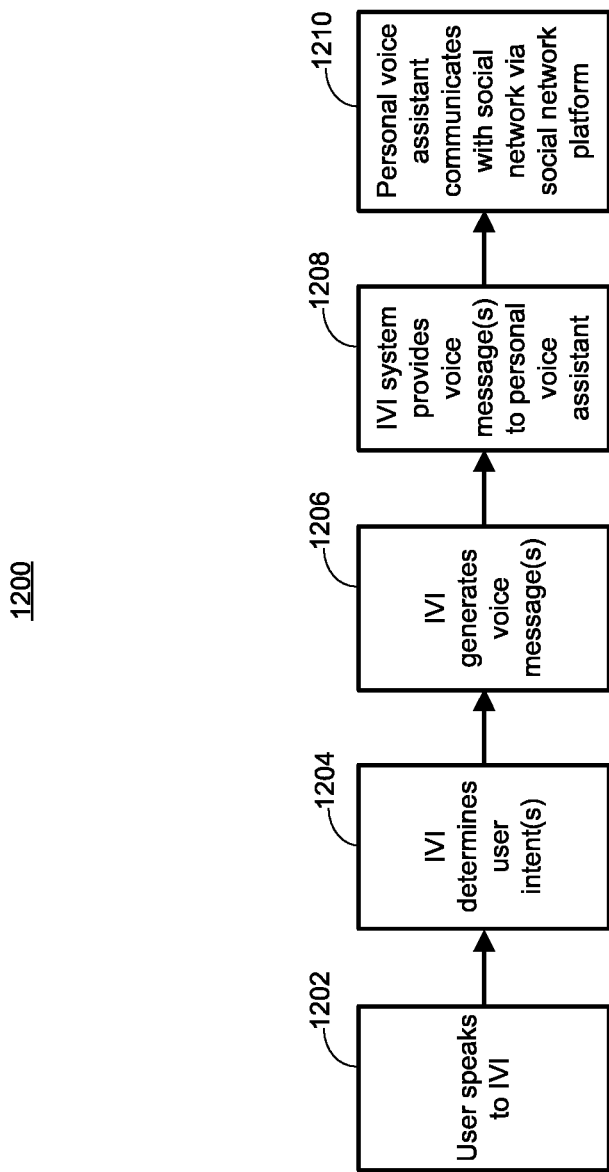
FIG. 12 depicts an exemplary process flow that may be implemented by the system of FIG. 11.

Exemplary Process Flow for Facilitating User Interactions with a Social Network Using an Intelligent Voice Interface FIG. 12 depicts an exemplary process flow 1200 that may be implemented in the system 1100 of FIG. 11. At stage 1202 of the process flow 1200, after deciding to take some action (e.g., share specific information) on his or her social network, the caller uses the caller device 1104 to contact the IVI system 1102, and the intelligent voice interface 1126 in response initiates a "call" or session with the caller. During the call, the user makes a voice statement, or series of voice statements, to the intelligent voice interface 1126. Alternatively, in some embodiments and scenarios, the user can provide voice statements to the IVI system 1102 via the personal voice assistant device 1106 (e.g., with the personal voice assistant device 1106 forwarding the user's raw voice message, or sequential portions of that raw voice message, to the IVI system 1102).

At stage 1204, the intelligent voice interface 1126 (more specifically, the bot 1140) uses the NLP model(s) 1142 to determine one or more user intents based on the user's statement(s). In some embodiments, the intelligent voice interface 1126 determines that the user statement(s) is/are to be forwarded to the personal voice assistant (e.g., to device 1106, or directly to server 1107) in response to the user expressly saying so (e.g., "Tell Alexa . . . "). In other embodiments and/or scenarios, the intelligent voice interface 1126 can infer that the user intends to say something to the personal voice assistant in the same way that the intelligent voice interface 1126 might infer other intents (e.g., by determining an intent to communicate with Alexa, a Sundial intent that requires communication with Alexa, etc., when the user says "Tell my Care Circle I need help with . . . " or "Tell my Circle I took my medication today," etc.).

At stage 1206, the intelligent voice interface 1126 (e.g., the bot 1140) generates one or more voice messages based upon the user's statement(s) (possibly after a request for user confirmation of the message(s)), in a format that is understandable to the personal voice assistant. For example, the intelligent voice interface 1126 may generate voice messages that use more common and/or clearer terminology or grammatical structures than were uttered by the user. As another example, the intelligent voice interface 1126 may divide a long voice statement from the user into multiple, shorter messages to comply with a maximum message duration of the personal voice assistant.

At stage 1208 the IVI system 1102 provides the voice message(s) to the personal voice assistant (e.g., to device 1106, or directly to server 1107). The voice message(s) may be synthesized voice messages generated by the TTS unit 1134 based on message text generated by the bot 1140, for example. The IVI system 1102 may deliver the voice message(s) to the personal voice assistant by initiating a "voice over IP" call with the device 1106 (or server 1107), or in any other suitable manner. In some embodiments and/or scenarios, this voice communication between the IVI system 1102 and device 1106 (or server 1107) is a two-way voice dialog, with the intelligent voice interface 1126 talking and listening to the personal voice assistant as needed in order to convey the information to the personal voice assistant (e.g., by responding to one or more prompts from the personal voice assistant, such as a prompt requesting that the intelligent voice interface 1126 confirm information that the intelligent voice interface 1126 provided to the personal voice assistant).

At stage 1210, the personal voice assistant communicates with the social network of the user via the social network platform supported by the social network platform server 1108 (e.g., via a specific application of the personal voice assistant that was specifically designed for use/communication with the social network platform). In particular, the personal voice assistant (e.g., the device 1106 or server 1107) may provide one or more messages (e.g., commands) to the social network platform server 1108, to cause the social network platform server 1108 to take one or more actions with respect to the user's social network.

As one example, a user may be an elderly person with a Care Circle comprising relatives, friends, and/or care givers, on a Sundial social network platform. The user may initially say to the intelligent voice interface 1126 (via the caller device 1104 and call application 1172): "Tell Alexa I need a refill of my heart medicine, um . . . [4 second pause] . . . let's see here [3 second pause] . . . Eliquis." The intelligent voice interface 1126 may process the audio, remove the pauses and unimportant words ("um" and "let's see here"), and deliver to the user's device 1106 and/or the server 1107 a shorter synthesized voice message saying "I need a refill of Eliquis" or "Tell my Care Circle I need a refill of Eliquis." In accordance with the instructions of an Alexa "skill" designed specifically for use with the Sundial platform, the device 1106 and/or server 1107 may process the synthesized voice message and cause that message (or corresponding information) to be delivered to one or more Care Circle members via messaging supported by the Sundial platform. For example, the device 1106 and/or server 1107 may cause the message or corresponding information to be delivered to the Care Circle member(s) via a website or dedicated application user interface, via email, via SMS text message, and/or by other suitable means.

As another example, the user may initially say to the caller device 1104 via the call application 1172: "Tell my Facebook friends that I'm having a party . . . [user has side conversation asking someone nearby about dates] . . . this coming Friday night." The intelligent voice interface 1126 may then identify the side conversation audio (e.g., by the audio handler 1136), remove the side conversation audio, and deliver the remaining (shorter) audio message, or a synthesized version of the remaining audio message, to the caller device 1104 (or directly to the server 1107) for processing by the device 1106 (e.g., an Amazon Echo device if talking to Alexa, or the caller device 1104 if talking to Siri, etc.). In accordance with the instructions of an application specifically designed for use with Facebook, the device 1106 and/or server 1107 may process the voice message from the intelligent voice interface 1126 and cause that message (or corresponding information) to be delivered to user's list of Facebook friends via messaging supported by the Facebook platform. For example, the device 1106 and/or server 1107 may cause the message or corresponding information to be delivered to the user's Facebook friends as a new Facebook post of the user, or via a Facebook messaging service, etc.

In alternative embodiments, the intelligent voice interface 1126 may instead serve as a substitute for the device 1106 and server 1107 (i.e., the system 1100 may not include device 1106 and server 1107). In these embodiments, the user uses the caller device 1104 and call application 1172 to communicate with the intelligent voice interface 1126 (as in the above examples), but the intelligent voice interface 1126 then communicates directly with the social network platform server 1108 in the appropriate format, rather than communicating with the device 1106 or server 1107.

Figure 13:
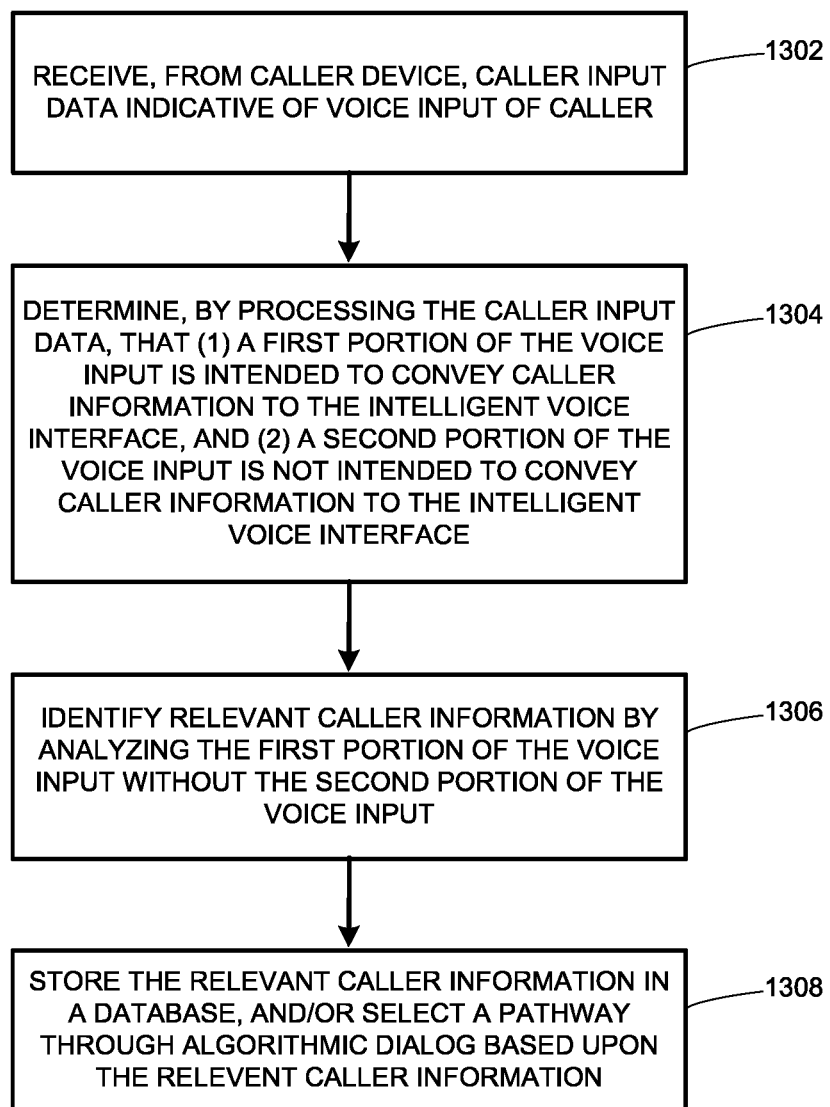
FIGS. 13-18 are flow diagrams depicting exemplary computer-implemented methods that may be implemented in systems such as the system of FIG. 1 or the system of FIG. 11.

Exemplary Computer-Implemented Methods for Identifying Relevant Caller Dialog with an Intelligent Voice Interface As shown in FIG. 13, a computer-implemented method 1300 for identifying relevant caller dialog with an intelligent voice interface may be provided, where the intelligent voice interface is configured to lead callers through pathways of an algorithmic dialog that may include one or more available voice prompts for requesting caller information (e.g., information associated with a caller account, a caller claim, caller personal information, an order being placed by the caller, an event involving the caller, etc.). The method 1300 may be implemented by an intelligent voice interface, such as the intelligent voice interface 126 of FIG. 1 (e.g., by the processing hardware 120 when executing the corresponding instructions stored in the memory 124). The method 1300 may be performed during a voice communication with the caller via the caller's device (e.g., caller device 104).

In the method 1300, caller input data is received from the caller device (block 1302). The caller input data is indicative of a voice input of the caller. For example, the caller input data may be raw voice data (e.g., a WAV file) that the intelligent voice interface converts to text, or may be already-converted text data (e.g., if the caller device 104 or another device instead applies a speech-to-text technique to the raw voice data). In some embodiments/scenarios, the caller input data is received in response to a voice prompt (requesting the caller information) that the intelligent voice interface had generated and sent to the caller device at an earlier time.

The method 1300 may also include determining, by processing the caller input data, that a first portion of the voice input is intended to convey caller information to the intelligent voice interface, and that a second portion of the voice input is not intended to convey caller information to the intelligent voice interface (block 1304). If the caller input data is raw voice data (an audio file), for example, the intelligent voice interface may identify/determine the first portion based upon the first portion being above some predetermined loudness threshold, and/or determine the second portion based upon the second portion being below some predetermined loudness threshold. Alternatively, or in addition, the intelligent voice interface may identify/determine either or both portions based upon textual content (i.e., words detected in those portions). Alternatively, or in addition, the intelligent voice interface may identify/determine either or both portions by attributing the voice in each portion to a different person (i.e., diarization), and determining that the speech by the non-caller is the second portion. In some embodiments, the intelligent voice interface only actively identifies the first portion or the second portion, and determines that the remaining portion is the second portion or the first portion, respectively, by default.

Relevant caller information is identified (block 1306) by analyzing the first portion of the voice input without the second portion of the voice input. Block 1306 may include using one or more natural language processing models (e.g., NLP model(s) 142) to determine one or more intents of the caller (e.g., by accessing a third party web service that provides access to the model(s), or by accessing local model(s)). Block 1306 or a later block may include discarding or deleting the second portion of the voice input without having used that portion to identify any relevant caller information.

The identified relevant caller information is stored in a database and/or is used to select a pathway through the algorithmic dialog (block 1308). If the relevant caller information is updated claim information, for example, block

1308 may include storing the updated information in a claims database, and/or providing a confirmation or follow-up prompt to the caller (rather than re-prompting the caller for the updated claim information according to a different pathway of the algorithmic dialog).

In some embodiments, block 1304 is performed by an audio handler (e.g., audio handler 136) or middleware (e.g., middleware 138) of the intelligent voice interface, and block 1306 is performed by a bot of the intelligent voice interface (e.g., bot 140 when using NLP model(s) 142). In some of these embodiments, the method 1300 may further include the audio handler or middleware providing the first portion of the voice input, but not the second portion of the voice input, to the bot. In some of these embodiments, the middleware may be configured, when the caller stops or pauses speaking, to wait a first amount of time before determining that the caller has finished speaking, and the bot may be configured to wait a second, shorter amount of time before determining that the caller has finished speaking in that situation. The method 1300 may then further include (if the bot determines that the caller has finished speaking before the first amount of time expires) the middleware receiving a voice prompt from the bot. The middleware may hold the voice prompt from the bot, and then either send the voice prompt to the caller device (in response to the first amount of time also expiring without the caller speaking), or discard the voice prompt (in response to the caller continuing to speak before the first amount of time also expires).

Figure 14:
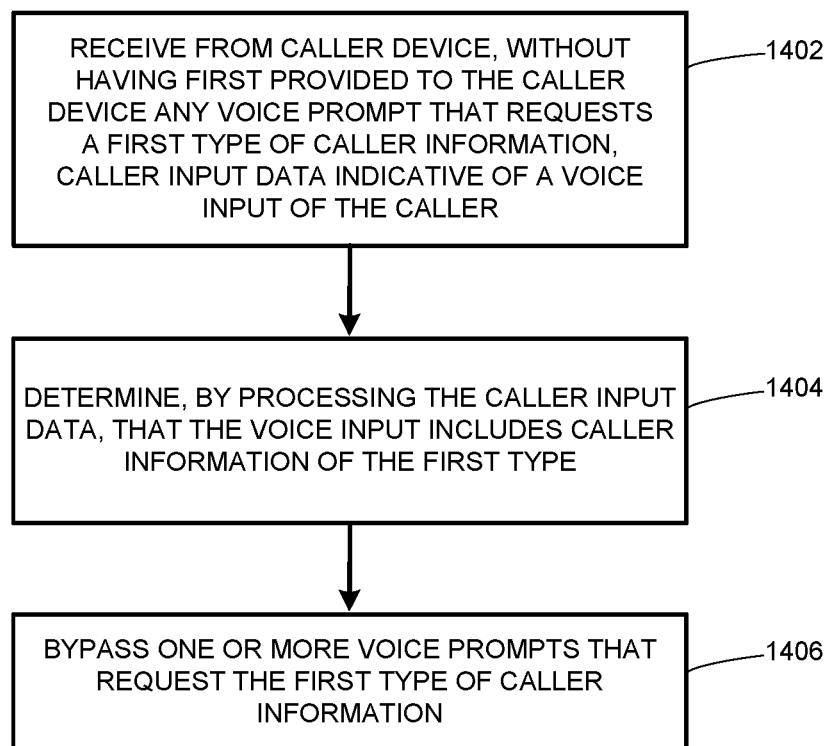

Exemplary Computer-Implemented Methods for Handling Out-of-Sequence Caller Dialog with an Intelligent Voice Interface As shown in FIG. 14, a computer-implemented method 1400 for handling out-of-sequence caller dialog with an intelligent voice interface may be provided, where the intelligent voice interface is configured to lead callers through pathways of an algorithmic dialog that may include a plurality of available voice prompts for requesting different types of caller information (e.g., information associated with a caller account, a caller claim, caller personal information, an order being placed by the caller, an event involving the caller, etc.). The method 1400 may be implemented (e.g., using a multi-core and/or multi-thread process) by an intelligent voice interface, such as the intelligent voice interface 126 of FIG. 1 (e.g., by the processing hardware 120 when executing the corresponding instructions stored in the memory 124). The method 1400 may be performed during a voice communication with the caller via the caller's device (e.g., caller device 104).

In the method 1400, caller input data is received from the caller device (block 1402), without the intelligent voice interface first having provided the caller device with any voice prompt that requests a particular, first type of caller information (e.g., a phone number). The caller input data is indicative of a voice input of the caller. For example, the caller input data may be raw voice data (e.g., a WAV file) that the intelligent voice interface converts to text, or may be already-converted text data. In some embodiments/scenarios, the caller input data is received at block 1402 after the intelligent voice interface generated and sent the caller device a voice prompt requesting a second, different type of caller information (e.g., a claim number), and while the intelligent voice interface is listening for a response to that voice prompt. In other embodiments/scenarios, the caller input data is received at block 1402 before the intelligent voice interface has provided any prompt to the caller device.

The method 1400 may also include determining, by processing the caller input data, that the voice input may include caller information of the first/non-requested type (block 1404). In some embodiments/scenarios, block 1404 may include determining that the voice input may also include another, second type of caller information that was requested by the intelligent voice interface, and/or other caller information.

After (e.g., in response to) the determination at block 1404, one or more voice prompts (of the algorithmic dialog) that request the first type of caller information are bypassed (block 1406). If the first type of caller information is a branch ID number, for example, the intelligent voice interface may bypass a prompt for the branch ID that would otherwise occur (e.g., the intelligent voice interface may instead proceed to confirming receipt of the branch ID via an additional voice message).

In some embodiments, after block 1404, the method 1400 may include identifying a dialog state to which the caller information of the first type pertains, selecting one or more natural language processing models based upon that dialog state, and determining one or more intents of the caller from the caller input data using the model(s).

Figure 15:
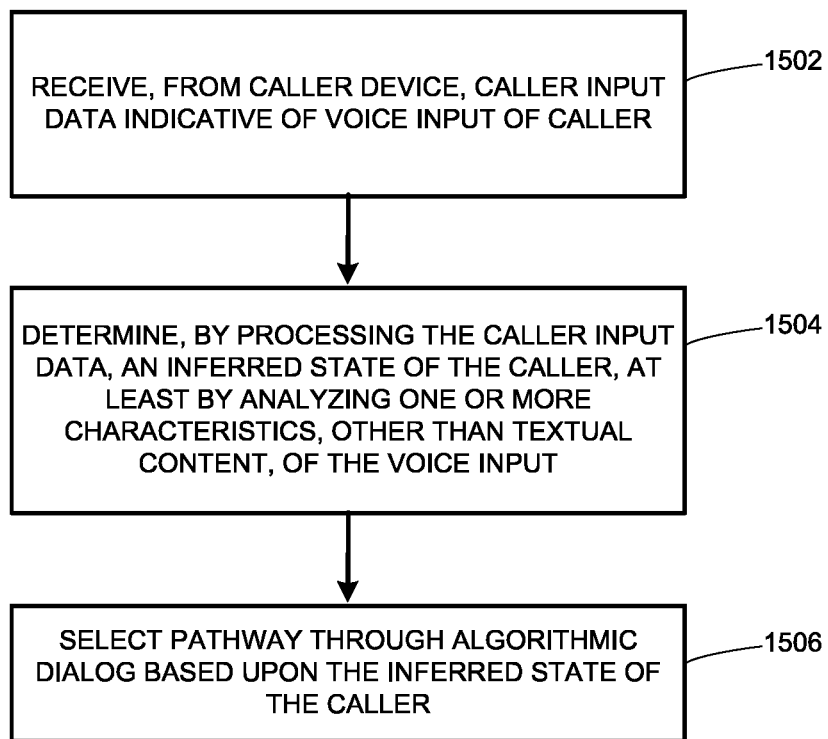

Exemplary Computer-Implemented Methods for Responding to Inferred Caller States During Dialog with an Intelligent Voice Interface As shown in FIG. 15, a computer-implemented method 1500 for responding to inferred caller states during dialog with an intelligent voice interface may be provided, where the intelligent voice interface is configured to lead callers through pathways of an algorithmic dialog that may include one or more available voice prompts for requesting caller information (e.g., information associated with a caller account, a caller claim, caller personal information, an order being placed by the caller, an event involving the caller, etc.). The method 1500 may be implemented by an intelligent voice interface, such as the intelligent voice interface 126 of FIG. 1 (e.g., by the processing hardware 120 when executing the corresponding instructions stored in the memory 124). The method 1500 may be performed during a voice communication with the caller via the caller's device (e.g., caller device 104).

In the method 1500, caller input data is received from the caller device (block 1502). The caller input data is indicative of a voice input of the caller. For example, the caller input data may be raw voice data (e.g., a WAV file) that the intelligent voice interface converts to text, or may be already-converted text data. In some embodiments/scenarios, the caller input data is received in response to a voice prompt (requesting the caller information) that the intelligent voice interface had generated and sent to the caller device at an earlier time.

The method 1500 may also include determining, by processing the caller input data, an inferred state of the caller (block 1504). Block 1504 may include analyzing one or more characteristics, other than textual content, of the voice input. For example, block 1504 may include analyzing loudness and/or pitch (e.g., patterns/changes in pitch) of the caller's voice, and/or the rapidity with which the caller speaks, to determine that the caller is impatient, angry, frustrated, happy, content, satisfied, and/or some other emotional state of the user. The inferred state may be one of three or more potential inferred states (e.g., "good mood," "bad mood," "neutral") or may be a binary determination of whether the caller is in a particular state (e.g., "dissatisfied" or "satisfied"), for example. In some embodiments and/or scenarios, block 1504 may include determining the inferred state based not only upon the one or more non-textual characteristic(s), but also the textual content of the voice input (e.g., whether the caller uttered an expression indicative of exasperation, etc.).

The method 1500 may also include selecting a pathway through the algorithmic dialog based upon the inferred state of the caller (block 1506). For example, block 1506 may include bypassing one or more voice prompts based upon the caller's inferred state. As another example, block 1506 may include providing (generating and sending to the caller device) a voice prompt that asks whether the caller would like to be transferred to a human representative, which otherwise would not be sent to the caller device at that point or state of the algorithmic dialog.

In some embodiments, the method 1500 may include a further block in which the voice communication with the caller is evaluated based upon the inferred state (e.g., by the call analyzer 128, as discussed above with reference to FIGS. 8-10).

Figure 16:
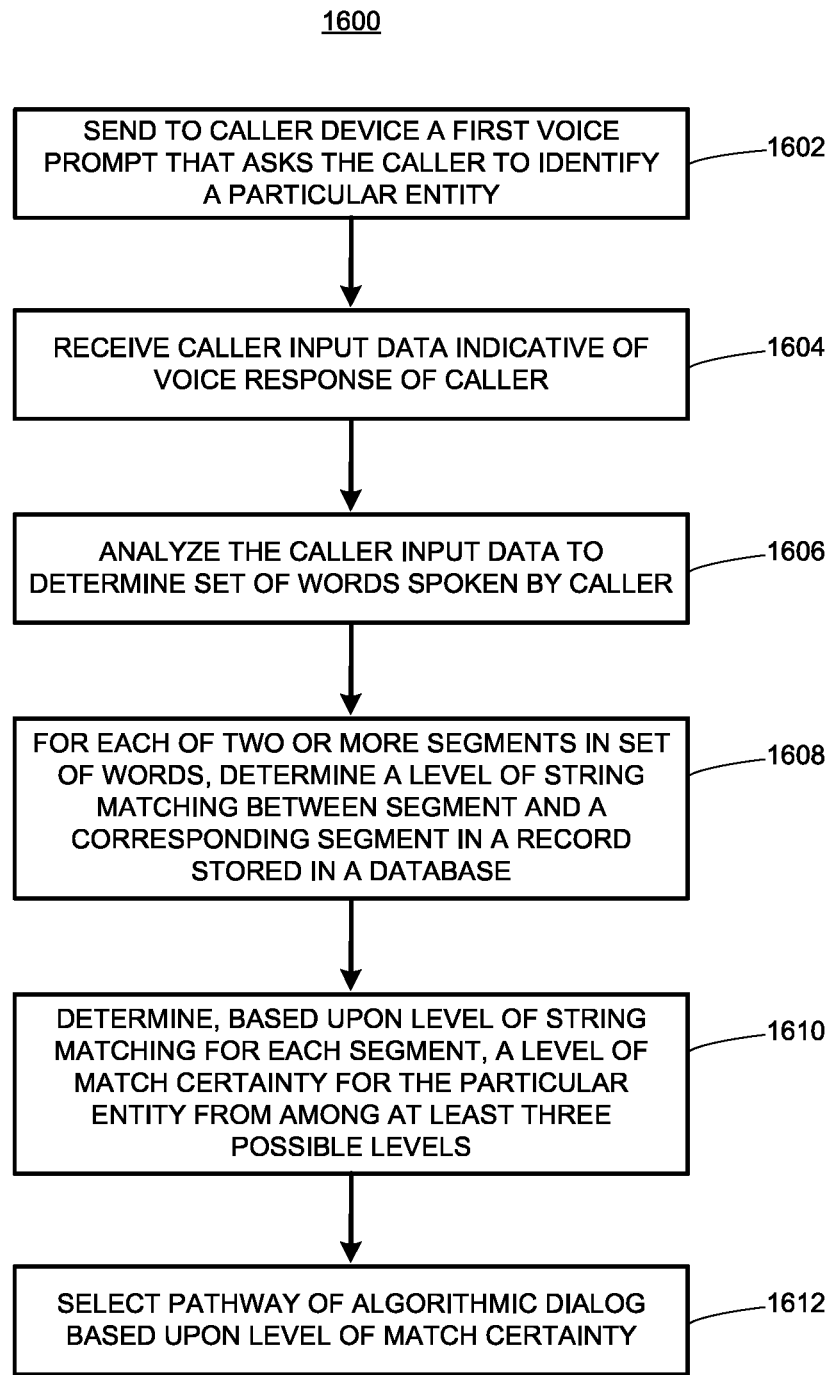

Exemplary Computer-Implemented Methods for Identifying Entities Based Upon Imperfect Information As shown in FIG. 16, a computer-implemented method 1600 for identifying entities based upon information callers provide to an intelligent voice interface may be provided, where the intelligent voice interface is configured to lead callers through pathways of an algorithmic dialog that may include one or more available voice prompts for requesting caller information (e.g., information associated with a caller account, a caller claim, caller personal information, an order being placed by the caller, an event involving the caller, etc.). The method 1600 may be implemented by an intelligent voice interface, such as the intelligent voice interface 126 of FIG. 1 (e.g., by the processing hardware 120 when executing the corresponding instructions stored in the memory 124). The method 1600 may be performed during a voice communication with the caller via the caller's device (e.g., caller device 104).

In the method 1600, a first voice prompt that asks for the caller to identify a particular entity is sent to the caller device (block 1602). The entity may be a particular vehicle, person, or structure (e.g., house), for example.

The method 1600 may also include receiving, from the caller device, caller input data indicative of a voice response of the caller (block 1604). For example, the caller input data may be raw voice data (e.g., a WAV file) that the intelligent voice interface converts to text, or may be already-converted text data.

The method 1600 may also include analyzing the caller input data to determine a set of words spoken by the caller (block 1606) and, for each segment of two or more segments of the set of words, determining a level of string matching between the segment and a corresponding segment in a record stored in a database (block 1608). The word segments may include segments corresponding to a year, make, and model of a vehicle, a street number and street name of an address for a particular structure, a first and last name (and perhaps middle name and/or suffix) of a person, and so on.

The method 1600 may also include determining, based upon the level of string matching for each of the two or more segments, a level of match certainty for the particular entity from among at least three possible levels of match certainty (block 1610). The determination at block 1610 may be based upon how many of the two or more segments have at least a threshold level of string matching, and/or based upon one or more other factors. The possible levels of match certainty may include a full match, a partial match, and no match, for example.

The method 1600 may also include selecting, based upon the determined level of match certainty, a pathway of the algorithmic dialog (block 1612). For example, block 1612 may include, when a partial match is determined at block 1610, sending the caller device a second voice prompt that asks the caller to confirm an identity of the particular entity, where the identity corresponds to the record stored in the database (e.g., "Do you mean a 2007 Hyundai Santa Fe?"). As another example, block 1612 may include, when a full match is determined at block 1610, sending the caller device a voice message that confirms the identity of the particular entity (e.g., "Thank you, I have the vehicle type.") or proceeds to a next prompt. As yet another example, block 1612 may include, when no match is determined at block 1610 (e.g., only a very poor match, or where no word is provided by the caller, etc.), sending the caller device a voice prompt that asks the caller to again identify the particular entity (e.g., "I'm sorry I didn't get that. What is the year, make, and model of the vehicle?").

Figure 17:
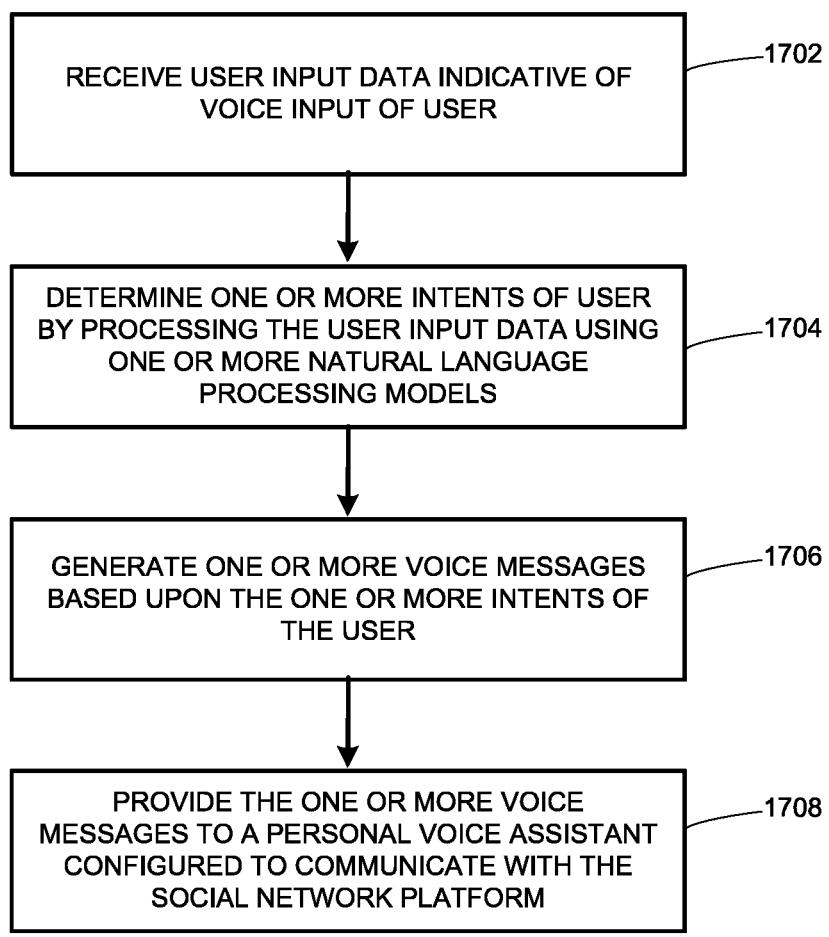

Exemplary Computer-Implemented Methods for Facilitating User Interactions with a Social Network Platform As shown in FIG. 17, a computer-implemented method 1700 for facilitating user interactions with a social network platform may be provided. The method 1700 may be implemented by an intelligent voice interface, such as the intelligent voice interface 1126 of FIG. 11 (e.g., by the processing hardware 1120 when executing the corresponding instructions stored in the memory 1124). The method 1700 may be performed during a voice communication with a user via the user's device (e.g., caller device 1104), or after the voice communication.

In the method 1700, user input data is received (block 1702). The user input data is indicative of a voice input of the user. For example, the user input data may be raw voice data (e.g., a WAV file) that the intelligent voice interface converts to text, or may be already-converted text data. The user input data may be received from the user's mobile or other device (e.g., caller device 1104), or from the user's personal voice assistant device (e.g., device 1106).

The method 1700 may also include determining, by processing the user input data using one or more natural language processing models (e.g., NLP model(s) 1142), one or more intents of the user (block 1704). For example, the model(s) may be used to determine that the user intends to communicate information to one or more entities in the user's social network on the social network platform, and/or the type of information to be communicated.

The method 1700 may also include generating, based upon the one or more intents of the user, one or more voice messages (block 1706). If the voice input of the user included one or more voice messages that convey information in a first format, for example, block 1706 may include converting those voice message(s) to one or more new voice messages that convey the information in a second, different format. Different "formats" may refer, for example, to different terminology (e.g., using more common vocabulary), different message duration limitations (e.g., maximum message duration), different grammatical structure, etc.

The method 1700 may also include providing, by the one or more processors, the one or more voice messages to a personal voice assistant configured to communicate with the social network platform (block 1708). The personal voice assistant may be any service (local, cloud-based, etc.) that provides voice interactions with a user, such as Amazon's Alexa, Apple's Siri, and so on. Block 1708 may include sending the voice message(s) to a personal computing device that implements at least a portion of the personal voice assistant (e.g., to an Amazon Echo or an iPhone), or sending the voice message(s) to a cloud-based server that implements or supports the personal voice assistant, for example. In some embodiments, providing the voice message(s) at block 1708 causes/triggers the personal voice assistant to communicate the information expressed in the voice message(s) (e.g., items to be purchased, a schedule, etc.) to the one or more social network entities via the social network platform, which in turn causes the social network platform to perform the desired action(s) (e.g., generating a post for the user, or sending one or more messages to one or more members of the social network, etc.).

Figure 18:
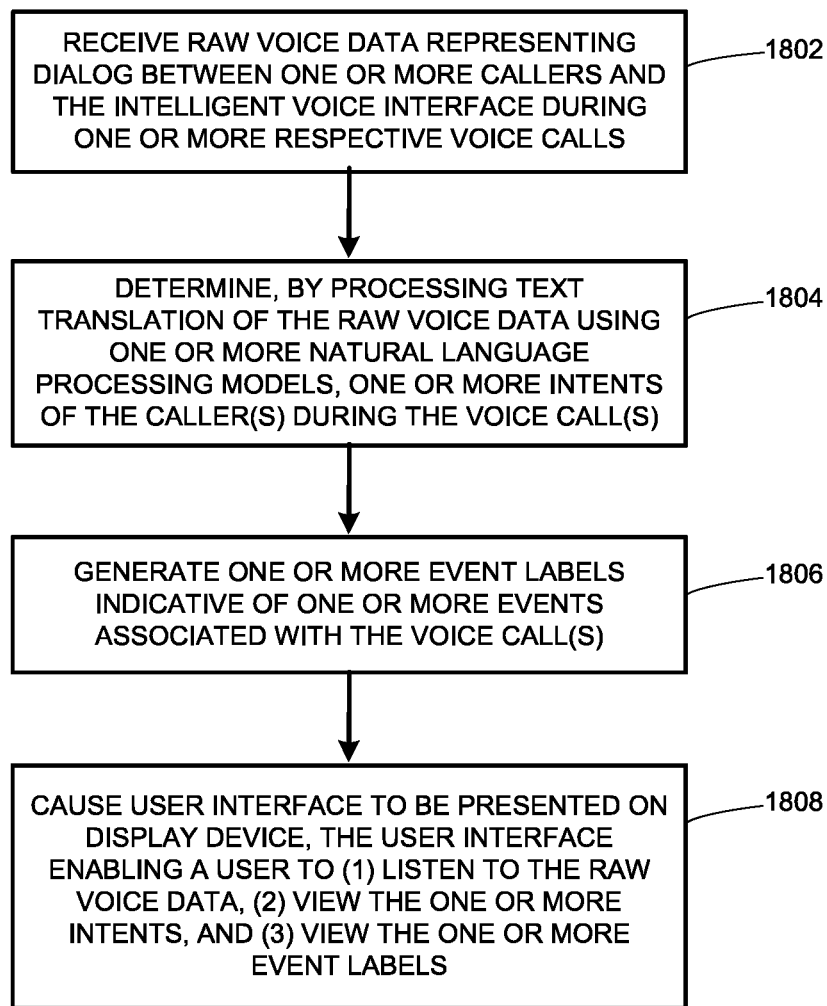

Exemplary Computer-Implemented Methods for Facilitating Reviews of Caller Interactions with an Intelligent Voice Interface As shown in FIG. 18, a computer-implemented method 1800 for facilitating reviews of caller interactions with an intelligent voice interface may be provided. The method 1800 may be implemented by a computing system, such as the intelligent voice interface system 102 of FIG. 1 (e.g., by the processing hardware 120 when executing the corresponding instructions stored in the memory 124). The method 1800 may or may not be hosted by the same computing system that implements the intelligent voice interface. The method 1800 may be performed during voice communications with callers via caller devices (e.g., similar to caller device 104), and/or after the voice communications (e.g., as a batch process).

In the method 1800, raw voice data is received (block 1802). The raw voice data represents dialog between one or more callers and the intelligent voice interface during one or more respective voice calls.

The method 1800 may also include determining one or more intents of the caller(s) during the voice call(s) (block 1804). Block 1804 may include processing text translation of the raw voice data (e.g., processing one text file per call) using one or more natural language processing models (e.g., NLP model(s) 142). In some embodiments, the method 1800 may also include generating the text translation from the raw voice data (e.g., by the STT unit 132).

The method 1800 may also include generating one or more event labels indicative of one or more events associated with the one or more voice calls (block 1806). The event labels may be generated by the call analyzer 128, for example, and may include one or more event labels indicative of the determined intent(s) of the caller(s) (e.g., as output by the NLP model(s) 142), one or more event labels indicative of an error event (e.g., a connection failure), one or more event labels indicative of a state of a voice call (e.g., a dialog state), one or more event labels indicative of a determination made based upon information provided by a caller during a voice call (e.g., whether a claim number is confirmed), and/or other event labels. For example, the event labels may include any one or more of the event labels listed above in Table 1, with each event label being associated with a particular call or call portion (e.g., a particular call turn).

The method 1800 may also include causing a user interface to be presented on a display device (block 1808). The user interface enables a user to listen to the raw voice data, view the one or more intents, view the one or more event labels, and possibly view other information (e.g., the text translation, event labels that were manually added by the same user or other users, etc.). The user interface may include information and controls similar to what is shown in FIGS. 10A-10D, for example.

In some embodiments, the method 1800 further may include generating (e.g., by the call analyzer 128) a rating for each of a plurality of voice calls, with each rating being indicative of performance of the intelligent voice interface and/or a result (e.g., a business result) of the respective voice call. In such embodiments, the user interface may further enable the user to view a list of the voice calls and their respective ratings.

In some embodiments, at least one of the event labels generated at block 1806 is generated using a machine learning model that was trained using manually-entered event labels. To train or refine such models, the user interface presented at block 1808 may enable users to manually enter event labels based on their reviews, and the method 1800 may further include associating any such event label(s) with the respective voice call, or with a specific portion (e.g., a specific turn) of the voice call. For example, a user may enter an event label indicating a caller was not prepared, an event label indicating the presence of substantial background noise during a voice call, an event label indicating that the intelligent voice interface did not understand a caller's accent, and so on, with each event label later being used as a label for training data (e.g., along with the corresponding audio file, text, and/or call metadata).

As with the other method flow diagrams disclosed herein, it is understood that, in some embodiments and/or scenarios, certain blocks may occur at least partially in parallel. For example, the system implementing the method 1800 may receive raw voice data for a first call at block 1802, and determine one or more intents for that call at block 1804, before receiving raw voice data for a second call at block 1802, etc.

Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for the systems, methods, and processes disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A computer-implemented method for identifying relevant caller dialog with an intelligent voice interface, wherein the intelligent voice interface is configured to lead callers through pathways of an algorithmic dialog that includes one or more available voice prompts for requesting caller information, the computer-implemented method comprising, during a voice communication with a caller via a caller device:
   receiving, from the caller device, by one or more processors implementing the intelligent voice interface, caller input data indicative of a voice input of the caller;
   determining, by the one or more processors processing the caller input data, that (i) a first portion of the voice input is intended to convey caller information to the intelligent voice interface, and (ii) a second portion of the voice input is not intended to convey caller information to the intelligent voice interface;
   identifying, by the one or more processors, relevant caller information by analyzing the first portion of the voice input without the second portion of the voice input;
   determining, via the one or more processors, that the relevant caller information does not match an expected caller information in the first portion of the voice input;
   in response to the determination that the relevant caller information does not match the expected caller information pausing, via the one or more processors, the caller input data for a predetermined amount of time before re-prompting to request caller information; and
   one or both of (i) storing, by the one or more processors, the relevant caller information in a database, and (ii) selecting, by the one or more processors, a pathway through the algorithmic dialog based upon the relevant caller information.

2. The computer-implemented method of claim 1, wherein the determining that (i) the first portion of the voice input is intended to convey caller information to the intelligent voice interface, and (ii) the second portion of the voice input is not intended to convey caller information to the intelligent voice interface includes:
   determining, based upon loudness associated with the caller input data, that (i) the first portion of the voice input is intended to convey caller information to the intelligent voice interface, and (ii) the second portion of the voice input is not intended to convey caller information to the intelligent voice interface.

3. The computer-implemented method of claim 1, wherein the determining that (i) the first portion of the voice input is intended to convey caller information to the intelligent voice interface, and (ii) the second portion of the voice input is not intended to convey caller information to the intelligent voice interface includes:
   attributing a voice in the first portion of the voice input to the caller; and
   attributing a voice in the second portion of the voice input to someone other than the caller.

4. The computer-implemented method of claim 1, wherein the determining that (i) the first portion of the voice input is intended to convey caller information to the intelligent voice interface, and (ii) the second portion of the voice input is not intended to convey caller information to the intelligent voice interface includes:
   determining, based upon words detected in the second portion of the voice input, that the second portion of the voice input is not intended to convey caller information to the intelligent voice interface.

5. The computer-implemented method of claim 1, wherein:
   receiving the caller input data indicative of the voice input of the caller includes receiving raw voice data; and
   the determining that (i) the first portion of the voice input is intended to convey caller information to the intelligent voice interface, and (ii) the second portion of the voice input is not intended to convey caller information to the intelligent voice interface comprises translating the raw voice data to text data.

6. The computer-implemented method of claim 1, wherein:
   receiving the caller input data indicative of the voice input of the caller includes receiving text data.

7. The computer-implemented method of claim 1, wherein identifying the relevant caller information includes using one or more natural language processing models to determine one or more intents of the caller.

8. The computer-implemented method of claim 7, wherein using the one or more natural language processing models includes accessing a third party web service that provides access to the one or more natural language processing models.

9. The computer-implemented method of claim 7, wherein:
   the intelligent voice interface comprises an audio handler, middleware, and a bot;
   the determining that (i) the first portion of the voice input is intended to convey caller information to the intelligent voice interface, and (ii) the second portion of the voice input is not intended to convey caller information to the intelligent voice interface is performed by the audio handler or the middleware;
   the method further comprises the middleware or the audio handler providing the first portion of the voice input, but not the second portion of the voice input, to the bot; and the identifying is performed by the bot using the one or more natural language processing models.

10. The computer-implemented method of claim 9, wherein:
when the caller stops or pauses speaking, (i) the middleware is configured to wait a first amount of time before determining that the caller has finished speaking and (ii) the bot is configured to wait a second amount of time before determining that the caller has finished speaking, the second amount of time being shorter than the first amount of time; and
the method further comprises, when the bot determines that the caller has finished speaking before the first amount of time expires:
the middleware receiving a voice prompt from the bot; and
the middleware (i) holding the voice prompt from the bot, and then (ii) either sending the voice prompt to the caller device in response to the first amount of time also expiring without the caller speaking, or discarding the voice prompt in response to the caller speaking before the first amount of time also expires.

11. The computer-implemented method of claim 1, further comprising:
before receiving the caller input data, generating, by the one or more processors, a first voice prompt of the available voice prompts, wherein the first voice prompt requests the caller information; and
sending, by the one or more processors, the first voice prompt to the caller device.

12. The computer-implemented method of claim 11, comprising selecting the pathway through the algorithmic dialog based upon the relevant caller information, and further comprising:
in response to selecting the pathway, generating, by the one or more processors, a second voice prompt of the available voice prompts, wherein the second voice prompt requests additional caller information; and
sending, by the one or more processors, the second voice prompt to the caller device.

13. An intelligent voice interface system comprising:
one or more processors; and
one or more memories storing instructions of an intelligent voice interface, wherein the intelligent voice interface is configured to lead callers through pathways of an algorithmic dialog that includes one or more available voice prompts for requesting caller information, and wherein the instructions, when executed by the one or more processors, cause the one or more processors to, during a voice communication with a caller via a caller device:
receive, from the caller device, caller input data indicative of a voice input of the caller;
determine, by processing the caller input data, that (i) a first portion of the voice input is intended to convey caller information to the intelligent voice interface, and (ii) a second portion of the voice input is not intended to convey caller information to the intelligent voice interface;
identify relevant caller information by analyzing the first portion of the voice input without the second portion of the voice input;
pause the caller input data for a predetermined amount of time if the relevant caller information does not match an expected caller information in the first portion of the voice input before re-prompting to request caller information; and
one or both of (i) store the relevant caller information in a database and (ii) select a pathway through the algorithmic dialog based upon the relevant caller information.

14. The intelligent voice interface system of claim 13, wherein the determining that (i) the first portion of the voice input is intended to convey caller information to the intelligent voice interface, and (ii) the second portion of the voice input is not intended to convey caller information to the intelligent voice interface includes:
determining, based upon loudness associated with the caller input data, that (i) the first portion of the voice input is intended to convey caller information to the intelligent voice interface, and (ii) the second portion of the voice input is not intended to convey caller information to the intelligent voice interface.

15. The intelligent voice interface system of claim 13, wherein the determining that (i) the first portion of the voice input is intended to convey caller information to the intelligent voice interface, and (ii) the second portion of the voice input is not intended to convey caller information to the intelligent voice interface includes:
attributing a voice in the first portion of the voice input to the caller; and
attributing a voice in the second portion of the voice input to someone other than the caller.

16. The intelligent voice interface system of claim 13, wherein the determining that (i) the first portion of the voice input is intended to convey caller information to the intelligent voice interface, and (ii) the second portion of the voice input is not intended to convey caller information to the intelligent voice interface includes:
determining, based upon words detected in the second portion of the voice input, that the second portion of the voice input is not intended to convey caller information to the intelligent voice interface.

17. The intelligent voice interface system of claim 13, wherein the caller information includes information associated with a caller account, a caller claim, caller personal information, an order being placed by the caller, and/or an event involving the caller.

18. The intelligent voice interface system of claim 13, wherein identifying the relevant caller information includes using one or more natural language processing models to determine one or more intents of the caller.

19. The intelligent voice interface system of claim 18, wherein:
the intelligent voice interface comprises an audio handler, middleware, and a bot;
the determining that (i) the first portion of the voice input is intended to convey caller information to the intelligent voice interface, and (ii) the second portion of the voice input is not intended to convey caller information to the intelligent voice interface is performed by the audio handler or the middleware;
the instructions further cause the one or more processors to provide, by the middleware or the audio handler, the first portion of the voice input, but not the second portion of the voice input, to the bot; and
the identifying is performed by the bot using the one or more natural language processing models.

20. An intelligent voice interface system comprising:
one or more processors; and
one or more memories storing instructions of an intelligent voice interface, wherein the intelligent voice interface is configured to lead callers through pathways of an algorithmic dialog that includes one or more available voice prompts for requesting caller information, and wherein the instructions, when executed by the one or more processors, cause the one or more processors to, during a voice communication with a caller via a caller device:

receive, from the caller device, caller input data indicative of a voice input of the caller;

determine, by processing the caller input data, that (i) a first portion of the voice input is intended to convey caller information to the intelligent voice interface, and (ii) a second portion of the voice input is not intended to convey caller information to the intelligent voice interface;

identify, using one or more natural language processing models to determine one or more intents of the caller, relevant caller information by analyzing the first portion of the voice input without the second portion of the voice input; and one or both of (i) store the relevant caller information in a database and (ii) select a pathway through the algorithmic dialog based upon the relevant caller information;

wherein:

the intelligent voice interface further comprises middleware configured to, when the caller stops or pauses speaking, wait a first amount of time before determining that the caller has finished speaking;

the intelligent voice interface further comprises a bot configured to, when the caller stops or pauses speaking, wait a second amount of time before determining that the caller has finished speaking, the second amount of time being shorter than the first amount of time;

the middleware is further configured to receive, when the bot determines that the caller has finished speaking before the first amount of time expires, a voice prompt from the bot; and the middleware is further configured to, when the bot determines that the caller has finished speaking before the first amount of time expires: (i) hold the voice prompt from the bot, and then (ii) either send the voice prompt to the caller device in response to the first amount of time also expiring without the caller speaking, or discard the voice prompt in response to the caller speaking before the first amount of time also expires.

* * * * *